US008972277B2

(12) United States Patent
Sullivan et al.

(10) Patent No.: US 8,972,277 B2
(45) Date of Patent: Mar. 3, 2015

(54) SYSTEM AND METHOD OF MARKETING USING AN INTELLIGENT COUPON FOR PASSIVE DATA CAPTURE IN AN APPLIED LAYERED IMAGE ASSEMBLY

(75) Inventors: John C. Sullivan, Madison, CT (US); Jeffrey S. Samson, Irvine, CA (US); Cory Price, Newport Beach, CA (US); Pedro Vaca, Whittier, CA (US); Basil Luck, Irvine, CA (US)

(73) Assignee: Action Wobble, Inc., Irvine, CA (US)

( * ) Notice: Subject to any disclaimer, the term of this patent is extended or adjusted under 35 U.S.C. 154(b) by 673 days.

(21) Appl. No.: 12/818,768

(22) Filed: Jun. 18, 2010

(65) Prior Publication Data

US 2010/0324920 A1 Dec. 23, 2010

Related U.S. Application Data

(60) Provisional application No. 61/218,191, filed on Jun. 18, 2009.

(51) Int. Cl.
*G06Q 30/00* (2012.01)
*G09F 3/00* (2006.01)
(Continued)

(52) U.S. Cl.
CPC .......... *G09F 3/0288* (2013.01); *G06Q 30/0207* (2013.01); *G06K 7/10861* (2013.01);
(Continued)

(58) Field of Classification Search
CPC ............. G09F 3/0288; G06Q 30/0207; G06Q 30/0241; B42D 15/00
USPC ........ 705/14.1, 14.4; 283/72, 75, 81, 94, 100, 283/109, 101; 40/124, 191
See application file for complete search history.

(56) References Cited

U.S. PATENT DOCUMENTS 2,254,545 A 9/1941 Roberts
3,427,642 A 2/1969 Mohr
(Continued)

FOREIGN PATENT DOCUMENTS

JP 06-305283 A 11/1994
JP 09-211835 A 8/1997
(Continued)

OTHER PUBLICATIONS

International Search Report and Written Opinion issued Jan. 4, 2011 in corresponding PCT Application No. PCT/US2010/39197.
(Continued)

*Primary Examiner* — Bennett Sigmond
(74) *Attorney, Agent, or Firm* — Pearne & Gordon LLP

(57) ABSTRACT

A method of manufacturing a layered image assembly and a marketing method are provided including a passive consumer behavior tracking method without requiring an "opt-in" process. The layered image assembly includes a base layer and a top layer with an inner area formed between. An opening is provided within a perimeter of the base layer to provide access to the inner layer. The inner layer is provided with a media that may comprise coupons, offers, advertisements, collapsible springs, animated collapsible springs having an image, etc. The media may include one or more symbols for conveying information. The layered image assembly may be attached to an item, such as a substrate, envelope, package, magazine, etc. The customer information relating to the item may be associated, or merged, with the information from the one or more symbols from the media. This merging of information may be used to track customer purchases, customer information, and the like.

29 Claims, 21 Drawing Sheets

(51) Int. Cl.
*G06Q 30/02* (2012.01)
*G06K 7/10* (2006.01)
*G06Q 99/00* (2006.01)
*B42D 15/00* (2006.01)
*G09F 3/02* (2006.01)

(52) U.S. Cl.
CPC ............ *G06Q30/02* (2013.01); *G06Q 99/00* (2013.01); *G09F 3/0297* (2013.01); *B42D 15/00* (2013.01); *G09F 2003/0257* (2013.01)
USPC ............ 705/14.1; 283/72; 283/100; 283/101; 283/109

(56) References Cited

U.S. PATENT DOCUMENTS

| | | | |
|---|---|---|---|
| 3,798,806 A | | 3/1974 | Sanford |
| 4,551,373 A | | 11/1985 | Conlon |
| 4,846,504 A | | 7/1989 | MacGregor et al. |
| 4,868,027 A | | 9/1989 | Hunkeler et al. |
| 5,238,272 A | | 8/1993 | Taylor |
| 5,403,636 A | | 4/1995 | Crum |
| 5,423,573 A | | 6/1995 | de Passille |
| 5,487,566 A | | 1/1996 | Hedge, Jr. |
| 5,770,841 A * | 6/1998 | Moed et al. ................ 235/375 |
| 5,822,735 A * | 10/1998 | De Lapa et al. ............ 705/14.26 |
| 6,029,883 A * | 2/2000 | Hechinger et al. ............ 229/71 |
| 6,042,149 A * | 3/2000 | Roshkoff .................... 283/67 |
| 6,135,507 A * | 10/2000 | Hamby et al. ................ 283/81 |
| 6,329,034 B1 | 12/2001 | Pendry et al. |
| 6,447,014 B1 * | 9/2002 | Seidl ........................ 283/81 |
| 6,520,542 B2 * | 2/2003 | Thompson et al. ............ 283/51 |
| 6,541,091 B2 * | 4/2003 | Washburn et al. ........... 428/40.1 |
| 7,219,095 B1 * | 5/2007 | Bezuijen et al. ............ 707/688 |
| 7,328,551 B1 * | 2/2008 | Torres, Jr. ................. 53/450 |
| 7,722,431 B2 | 5/2010 | Sullivan et al. |
| 7,735,874 B2 * | 6/2010 | Bridges ..................... 283/101 |
| 7,904,394 B2 * | 3/2011 | Marks et al. ................ 705/404 |
| 8,196,324 B2 * | 6/2012 | Sullivan et al. .............. 40/638 |
| 2004/0054575 A1 * | 3/2004 | Marshall ..................... 705/14 |
| 2004/0135363 A1 * | 7/2004 | Vanderheiden et al. ...... 281/15.1 |
| 2005/0087978 A1 * | 4/2005 | Tucker ....................... 283/105 |
| 2006/0080871 A1 * | 4/2006 | McGoey et al. ........... 40/124.11 |
| 2007/0089334 A1 | 4/2007 | Sullivan et al. |
| 2008/0028646 A1 * | 2/2008 | Sullivan et al. .......... 40/124.191 |
| 2008/0110808 A1 * | 5/2008 | Takahashi .................... 209/547 |
| 2011/0213491 A1 * | 9/2011 | Rundle et al. ................ 700/215 |

FOREIGN PATENT DOCUMENTS

| | | |
|---|---|---|
| JP | 03073373 U | 9/2000 |
| JP | 2001-080254 A | 3/2001 |
| JP | 2002-178677 A | 6/2002 |
| JP | 2003-061799 A | 3/2003 |
| WO | WO 99/04326 * | 1/1999 |

OTHER PUBLICATIONS

International Search Report and Written Opinion issued Dec. 24, 2010 in PCT Application No. PCT/US2010/035618.
Office action issued Dec. 8, 2009 in U.S. Appl. No. 11/834,898.
Office action issued Dec. 21, 2010 in U.S. Appl. No. 11/834,898.
Examination Report issued Sep. 17, 2010 in New Zealand Patent Application No. 575347.
Examination Report issued Oct. 12, 2010 in Australian Patent Application No. 2007281755.
Office action issued Apr. 1, 2011 in Chinese Patent Application No. 200780036687.2.
Office action issued Jun. 9, 2011 in U.S. Appl. No. 11/834,898.
International Search Report and Written Opinion issued Dec. 18, 2007 in PCT Patent Application No. PCT/US07/75357.
Office action issued Nov. 3, 2011 in U.S. Appl. No. 11/834,898.
Office action issued Jun. 4, 2010 in Chinese Patent Application No. 200780036687.2 with English-language summary.

* cited by examiner

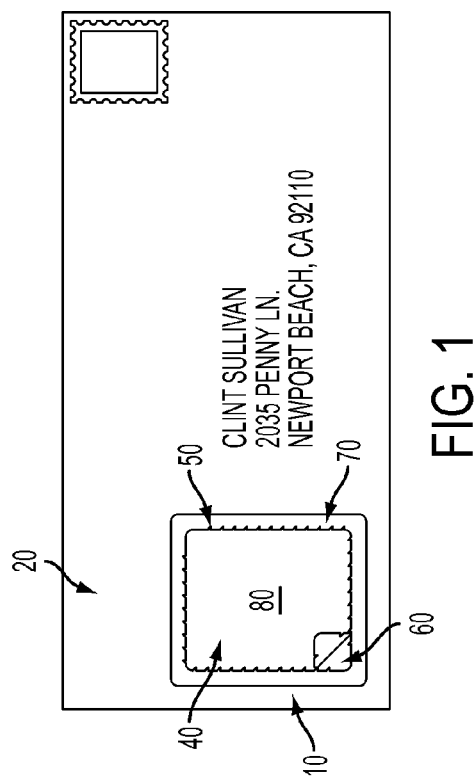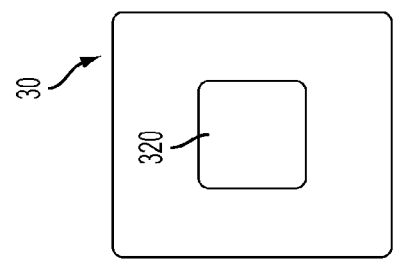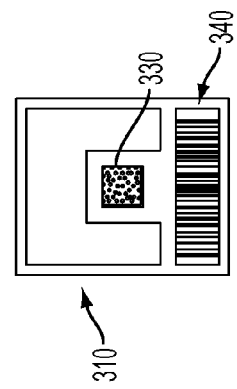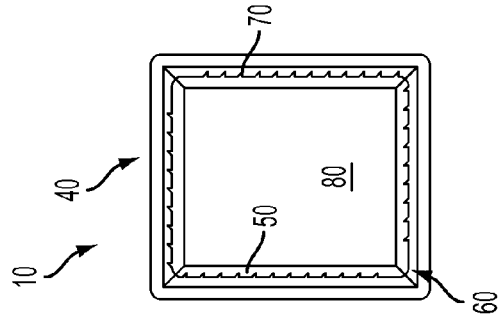

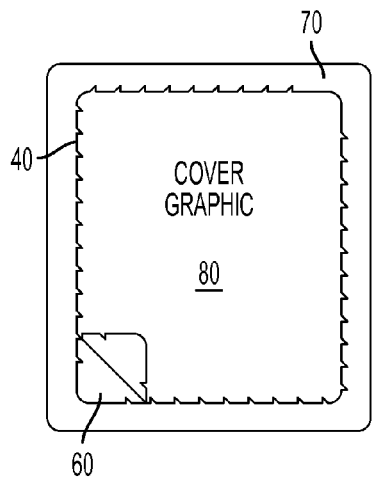
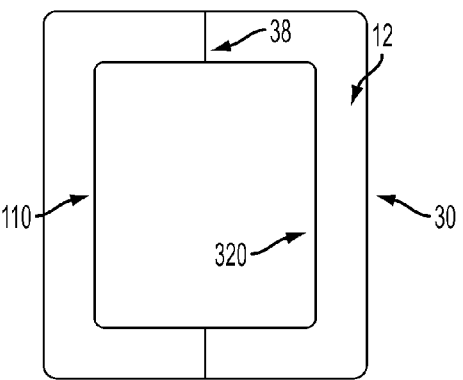
FIG. 8A    FIG. 8B
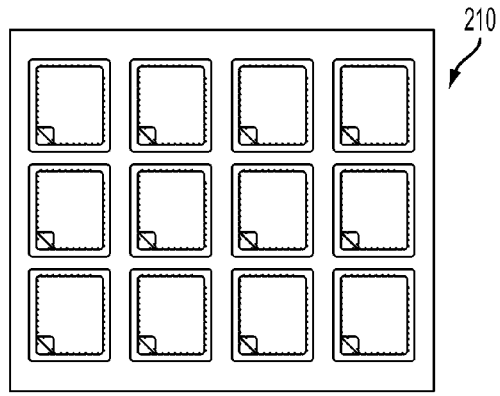
FIG. 9
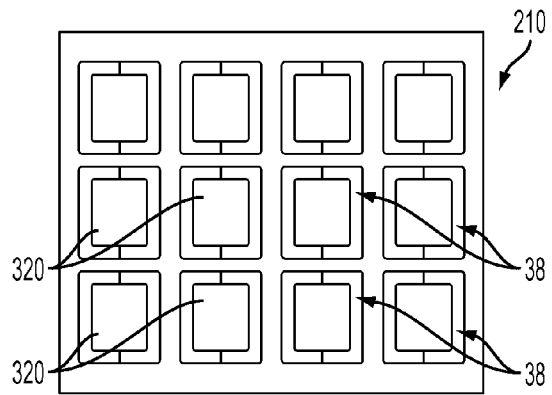
FIG. 10

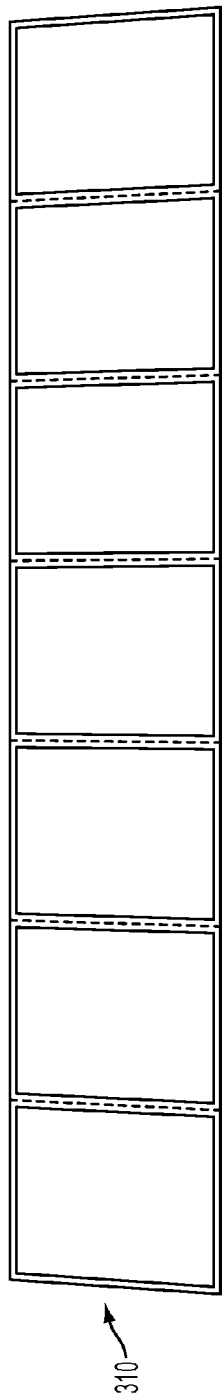
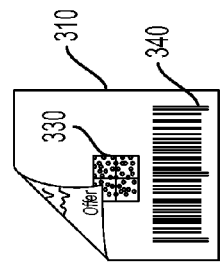
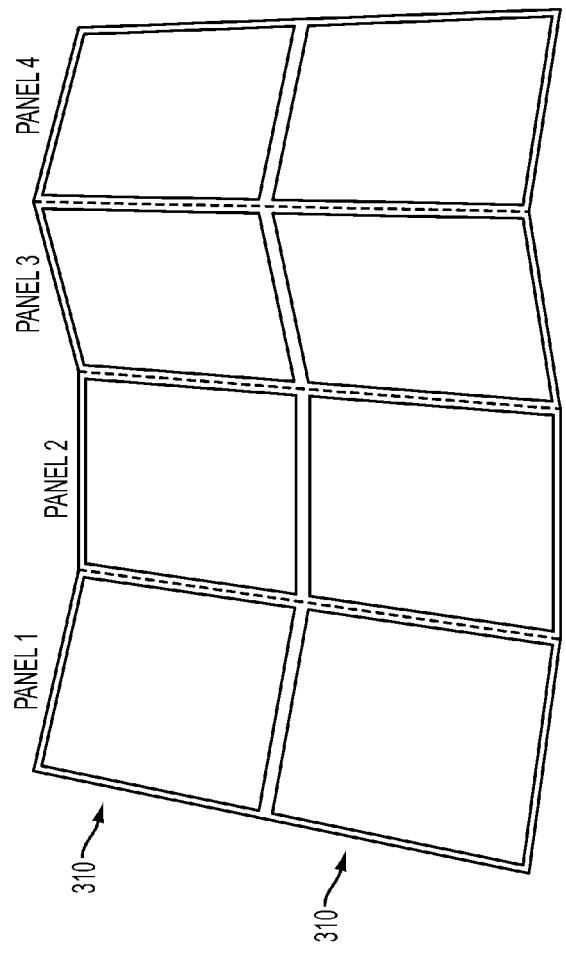
FIG. 21
FIG. 21A
FIG. 21B

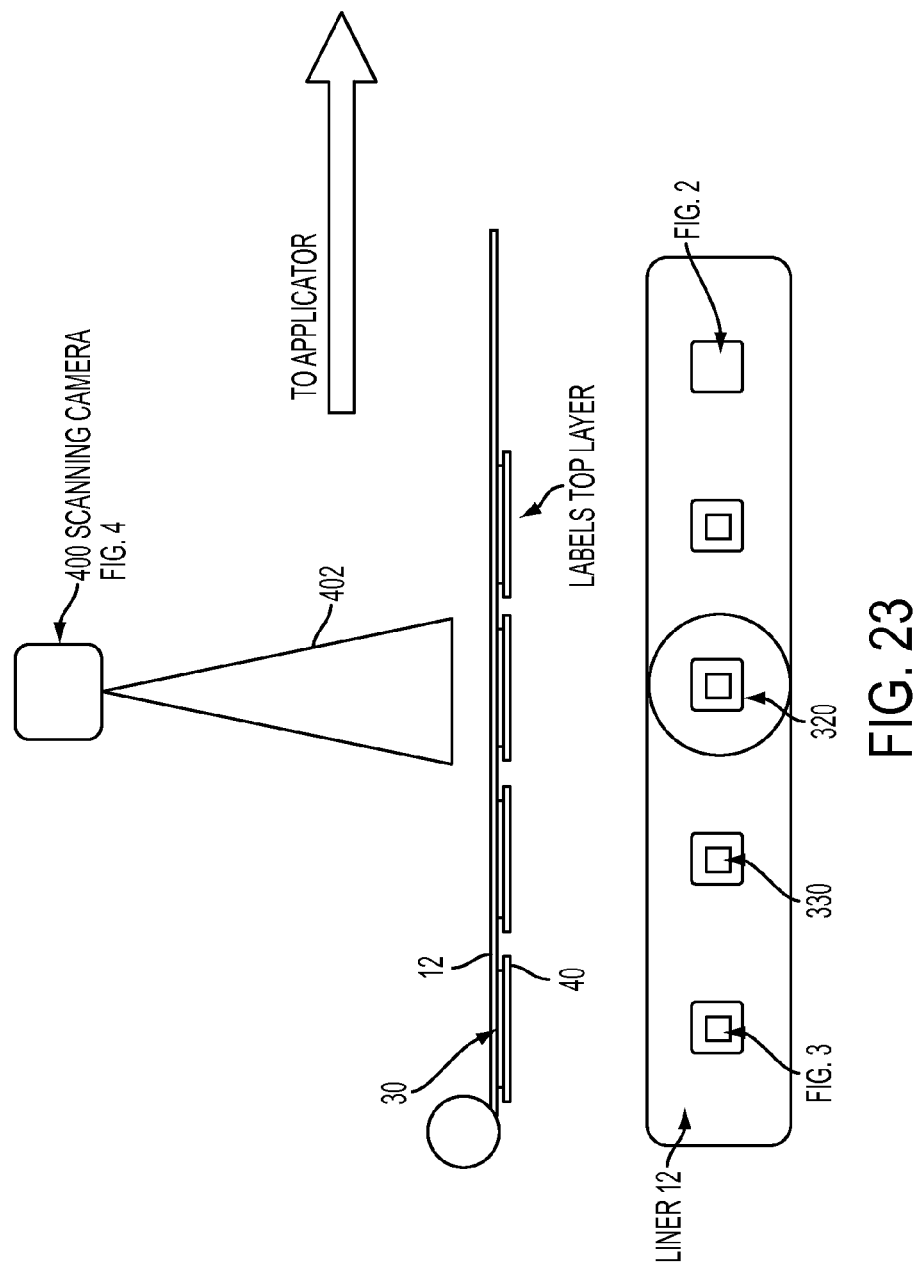

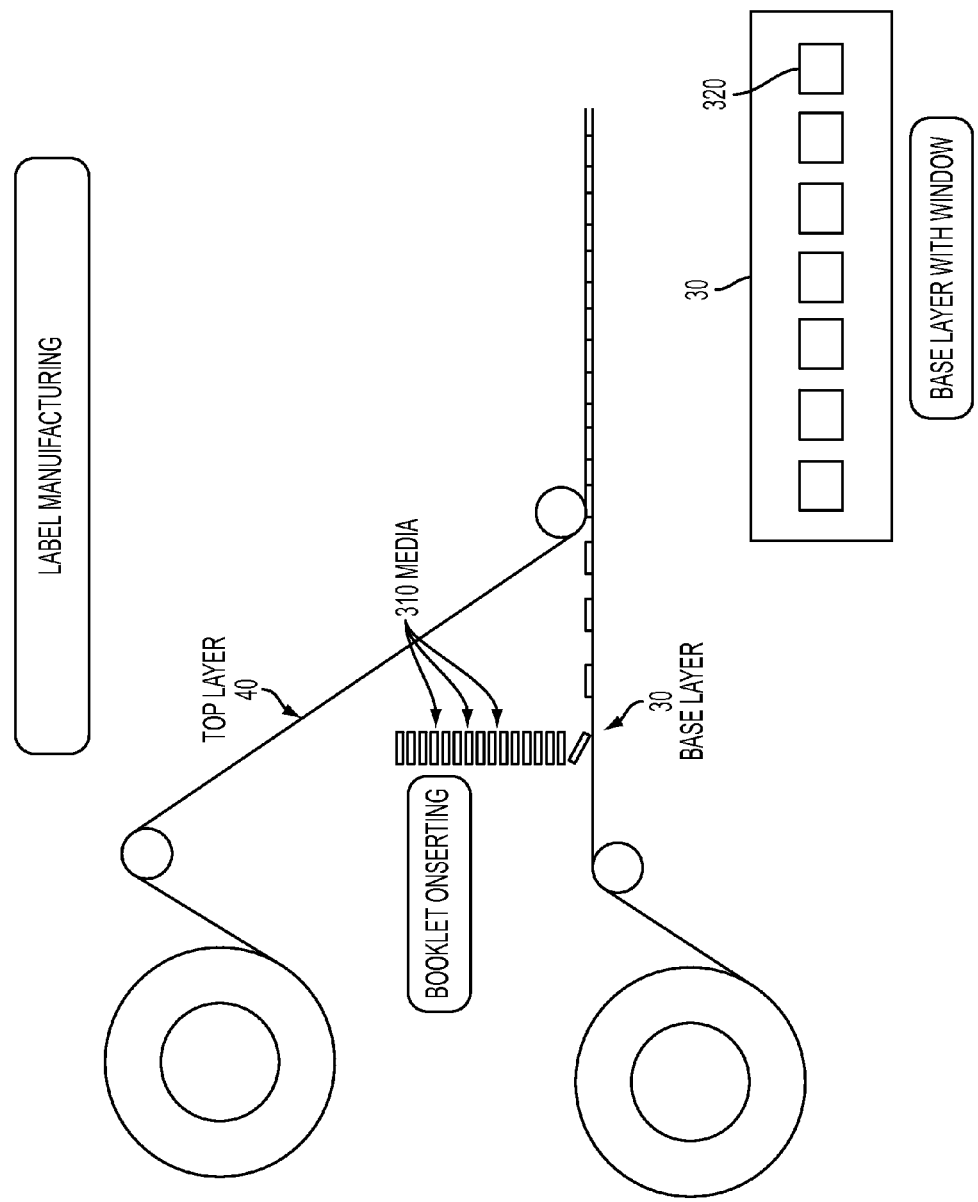

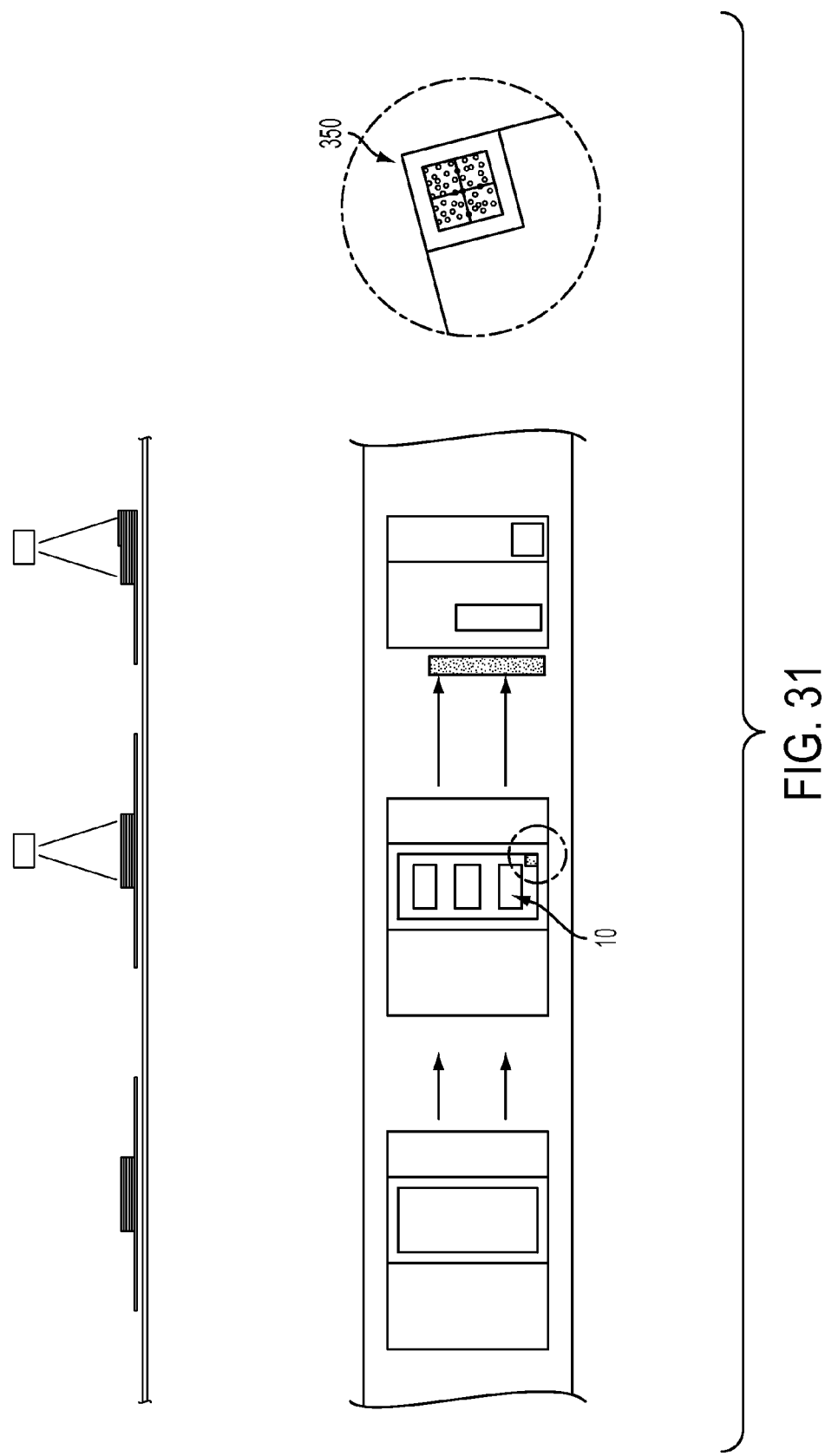

SYSTEM AND METHOD OF MARKETING USING AN INTELLIGENT COUPON FOR PASSIVE DATA CAPTURE IN AN APPLIED LAYERED IMAGE ASSEMBLY

CROSS REFERENCE TO RELATED APPLICATIONS

This application claims the benefit of U.S. Provisional Patent Application No. 61/218,191, filed on Jun. 18, 2009 and entitled SYSTEM AND METHOD FOR MARKETING.

BACKGROUND OF THE INVENTION

1) Field of the Invention

The present invention relates to a layered assembly, and more particularly, to a layered image assembly for holding media and the layers are configured to conceal the media until a user peels away one of the layers, where the media includes a symbol that identifies offers or advertisements associated with the symbol, and allows for the merging of the symbol information with customer information to identify a recipient.

2) Description of Prior Art

Envelopes and magazines may be printed with customer information, such as a customer's name, address, email address, etc. The envelopes and magazines may further include coupons, offers, or advertisements. After a user receives the envelopes and magazines, she can redeem the coupons or offers at a store. It would be beneficial to merge customer information, such as a name, address, email address, with the coupon and offer information that is provided. By merging this information, a retailer would be able to track the customers who redeemed certain coupons, and can develop marketing strategies based on this customer information. For instance, personalized offers can be provided to the customer depending on the prior coupons or offers that were redeemed. As such, a passive consumer behavior tracking method is needed without requiring a customer to submit to an "opt-in" process.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In accordance with an aspect of the present invention, a method of manufacturing a layered image assembly is provided. The method includes: providing a base layer including a first side and a second side; providing a media on the first side of the base layer, the media including a first symbol and a second symbol; and securing a top layer to a peripheral portion of the first side of the base layer, thereby enclosing the media between the base layer and the top layer, wherein at least one of the first symbol and the second symbol are visible through at least one of the base layer and the top layer.

In accordance with another aspect of the present invention, a marketing method is provided. The method includes: reading information relating to at least one of a first symbol and a second symbol provided on a media and storing the symbol information in a database; coupling the media to a mailable item, the mailable item having customer information provided thereon; reading the customer information and storing the customer information in the database; and associating the information read from the first and/or second symbol with the customer information.

In accordance with another aspect of the present invention, A marketing system is provided. The system includes: a layered image assembly including: a base layer including a first side and a second side; media provided on the first side of the base layer, the media including a first symbol and a second symbol; and a top layer secured to a portion of the first side of the base layer, wherein the media is positioned between the first side of the base layer and the top layer, wherein one of the first and second symbols is associated with media information and wherein the other of the first and second symbols is associated with customer information.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

BRIEF DESCRIPTION OF THE DRAWINGS

The foregoing and other features and advantages of the present invention will become apparent to those skilled in the art to which the present invention relates upon reading the following description with reference to the accompanying drawings.

FIG. 1 illustrates a layered image assembly that includes a top layer where the layered image assembly is mounted on a support surface in accordance with an aspect of the present invention.

FIG. 2A illustrates a front view of an example of the top layer of FIG. 1 in accordance with an aspect of the present invention.

FIG. 2B illustrates a rear view of the layered image assembly of FIG. 1 which includes an example base layer located underneath the top layer of FIG. 1 in accordance with an aspect of the present invention.

FIG. 2C illustrates a rear view of an example of the media loaded in the base layer of FIG. 2B in accordance with an aspect of the present invention.

FIG. 8 illustrates a front and a rear view of the layered image assembly of FIG. 1 in accordance with an aspect of the present invention.

FIG. 9 illustrates a front view of an example carrier sheet assembly having a plurality of layered image assembly assemblies thereon in accordance with an aspect of the present invention.

FIG. 10 illustrates an example of a rear view of the carrier sheet assembly of FIG. 9 in accordance with an aspect of the present invention.

FIG. 21 illustrates an example media to be placed in the layered image assembly.

FIG. 21-a illustrates a second example media to be placed in the layered image assembly.

FIG. 21-b illustrates a third example media to be placed in the layered image assembly.

FIG. 23 illustrates a schematic showing how a symbol on the layered image assembly is detected by an optical device.

FIG. 24 illustrates an example schematic for manufacturing the layered image assembly.

FIG. 31 illustrates a second stage of the example process of FIG. 30.

DESCRIPTION OF EXAMPLE EMBODIMENTS

Figure 3:
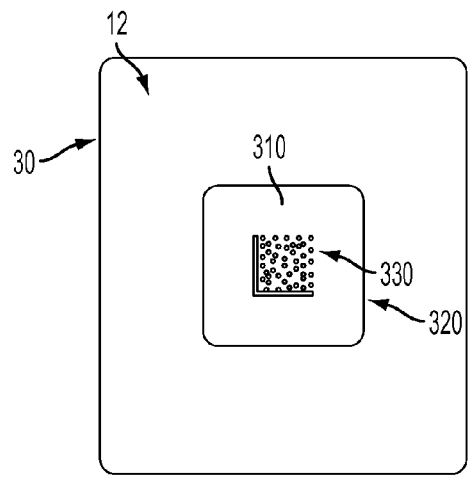
FIG. 3 illustrates a rear view of the layered image assembly of FIG. 1 which includes an example of a liner layer and a base layer that is located underneath the top layer in FIG. 1 in accordance with an aspect of the present invention.

The present invention relates to an assembly having two or more layers wherein at least one of the layers includes an image thereon, the image can include text, a photograph, a drawing, or any other suitable image and any combination thereof. The present invention will now be described with reference to the drawings, wherein like reference numerals are used to refer to like elements throughout. It is to be appreciated that the various drawings are not drawn to scale from one figure to another nor inside a given figure, and in particular that the size of the components are arbitrarily drawn for facilitating the reading of the drawings. In the following description, for purposes of explanation, numerous specific details are set forth in order to provide a thorough understanding of the present invention. It may be evident, however, that the present invention may be practiced without these specific details.

Referring initially to FIG. 1, a layered image assembly 10 is shown. The layered image assembly 10 is configured to be loaded with media. The media can include a photograph, a picture, a drawing, a z-fold item, informational media, such as text, brochures, coupons, advertisements, etc., an object, such as a wobble object as described in U.S. Patent Application No. 2005-0001113, issued as U.S. Pat. No. 7,722,431, and/or any other suitable insert that can be loaded within the layered image assembly 10. The media can be concealed or hidden from a recipient until a top layer is peeled away. The media can also further be mounted on a spring assembly as described in U.S. Patent Application No. 2007-0089334. The layered image assembly 10 can be secured to a surface of an item 20, such as an envelope, package, mailer, card, magazine, book, food packaging, textiles, including clothing, and any other suitable material or structure. The layered image assembly 10 includes a liner layer 12, a base layer assembly 30, and a top layer 40. Only the top layer 40 is shown in FIG. 1. The top layer 40 can include a perforation or any other peel-a-way process 50 and at least one corner of the top layer 40 can have a top layer peel-a-way tab 60. The perforation 50 can have a variety of shapes and sizes including but not limited to the shape shown. Alternatively, the layered image assembly 10 does not include peel-away label or a liner layer 12. Thus, the layered image assembly 10 can be freely moved, transported, or inserted into other packages without being secured to any other items 20.

Further, as shown more clearly in FIG. 2A, the perforation 50 can be of a closed loop configuration. For instance, in the rectangular shape shown in FIG. 2A, the perforation includes both horizontal and vertical line-type perforations. Each individual cut of the perforation comprises an obtuse angle having a first leg and a second leg, the first leg being longer than the second leg. The perforation can be arranged such that the first legs of the perforation cuts are positioned linearly along the edge desired to be separated. As shown in FIG. 2A, the horizontal perforation cuts can be arranged such that the angles open to the right and the vertical perforation cuts can be arranged such that the angles open to the left. However, it is to be appreciated that any other suitable perforation and configuration can be employed.

In the example shown, the perforation 50 is of a rectangular shape within the interior of the top layer 40. The top layer 40 comprises a frame portion 70 located on the exterior of the perforation 50 and an inner portion 80 on the interior of the perforation 50. The top layer peel-a-way tab 60 can be grasped and lifted by a user to peel off a portion of the top layer 40 to reveal the media loaded within the layered image assembly 10. The tabbed portion or the top layer peel-a-way tab 60 can be created during manufacturing of the perforation or during a separate manufacturing step, such as a separate die-cut operation. It is to be appreciated that any suitable operation for creating the tabbed portion can be employed. An example of the top layer 40 is shown in FIG. 2A, where the top layer peel-a-way tab 60 has a rounded corner. Alternatively or additionally, at least one corner of the inner portion 80 can include and easy lift tab or be otherwise suitably configured to facilitate easy removal of the inner portion 80 from the frame portion 70. As another alternative, the assembly 10 could be configured such that the entire top layer 40 can be removed by a user.

The top layer 40 is constructed from any suitable material, such as paper, plastic, or the like. Alternatively, the frame portion 70 can be constructed from a different material than the inner portion 80, if desired. It is to be appreciated that any suitable material(s) can be used for the frame portion 70 and the inner portion 80. Both materials are preferably durable enough to survive standard shipping, if used in that context. The frame portion 70 of the top protective layer 40 can be affixed permanently on all sides to the base layer assembly 30. The inner portion 80 can then be removed to reveal one or more layers inserted between the base layer assembly 30 and the top protective layer 40. Additionally, although not shown, the top layer 40 can be laminated if desired. The top layer 40 includes a first side that faces a user and a second side that faces an inner area 36 that is configured to be loaded with media, as will be described in more detail below. The lamination can be provided on one or both of the first and second sides of the top layer 40. If the top layer 40 includes a perforation, the lamination layer can also include a corresponding perforation. Likewise, if the top layer 40 is configured such that the user peels away the entire layer (e.g., not perforated), the lamination layer will be configured to pull off with the entire top layer (e.g., not perforated). It is to be appreciated that any other layer of the layered image assembly can also be lamination and is contemplated as falling within the scope of the present invention.

FIG. 2B illustrates a rear view of a base layer 30 that is located underneath the top layer 40. The base layer 30, in this example, includes an aperture 320 that is configured to reveal a portion of the contents or media that is loaded in the layered image assembly 10. FIG. 2C illustrates a rear view of an example of a media 310 loaded in the base layer of FIG. 2B. This example shows that the media includes a first symbol 330 and a second symbol 340. It is appreciated that various types of symbols with varying dimensions, shapes, and orientations can be placed on the media 310.

FIG. 3 illustrates a rear view of the layered image assembly 10. More particularly, the liner layer 12 and the base layer assembly 30 are shown. The base layer assembly 30 is located between the top layer 40 shown in FIG. 1 and the item 20, which is an envelope in this example. The liner layer 12 can be a protective liner to protect an adhesive layer on the base layer assembly 30 until the layered image assembly 10 is ready for use. The liner layer 12 can be peeled away from the base layer 30 to reveal the adhesive layer or sticky surface. After the liner layer 12 is removed, the layered image assembly 10 can be sealed or attached to a base surface. The dimensions of the layered image assembly 10 may vary considerably. In one example, the dimensions may be in the range of 2.5"×3", but other dimensions are contemplated. Any suitable size and shape of the layered image assembly, of the inserted media, and of the various layers shown and described herein, for example, can be realized with the present invention and as such the scope of the present invention it is not to be limited to any particular size or shape. The liner layer 12 can be peeled away from the base layer 30 to reveal a sticky surface to seal the layered image assembly 10 to a base surface 20. The liner layer 12 is peeled away from the base layer 30 along a corner of the layered image assembly 10 in this example. In other examples, other locations of the liner layer 12 can be removed such as by providing different cuts along the liner layer 12. For example, FIG. 3 also can include a kiss cut (not shown) that allows the liner layer 12 to be peeled off the base layer assembly 30. The kiss cut can have a variety of orientations, dimensions, and shapes. FIG. 3 also shows an example aperture 320 that reveals a portion of the media 310 located within the layered image assembly 10. The media 310 includes a first symbol 330 in this example, as will be described.

Figure 4A:
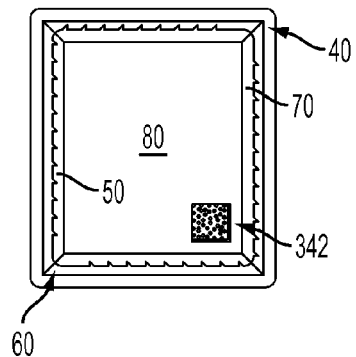
FIG. 4A illustrates a front view of a second example top layer that is at least partially transparent in accordance with an aspect of the present invention.

FIG. 4A illustrates a front view of a second example top layer 40. In this example, the top layer 40 is at least partially transparent. A third symbol 342 can then be printed on the top of the media 310 that is located within the layered image assembly 10. In this example, the third symbol 342 can be provided in lieu of or in addition to the first symbol 330. In an example where the third symbol 342 is provided in lieu of the first symbol 330, the aperture 320 does not need to be provided. The third symbol 342 can identify the media 310, such as coupons, that are provided to a customer. The transparency of the top layer 40 allows the third symbol 342 to be detected by an optical device. Thus, third symbol 342 provides an identification symbol that can be scanned from the top of the layered image assembly 10. In other examples, the top layer 40 can have a transparent window of various sizes and shapes that correspond to the location of the third symbol 342.

Figure 4B:
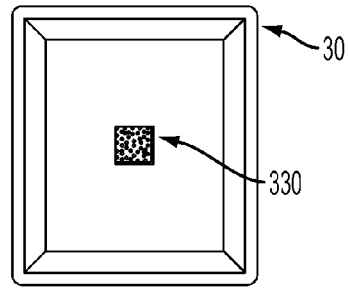
FIG. 4B illustrates a front view of a second example base layer that is at least partially transparent in accordance with an aspect of the present invention.

FIG. 4B illustrates a rear view of a second example base layer 30 that is at least partially transparent. The first symbol 330 is provided on the media 310 that is located within the layered image assembly 10. The first symbol 330, such as the bar code shown, is visible to an optical device through the transparent portion of the base layer 30. The base layer 30 can have a transparent window of various sizes and shapes that correspond to the location of the first symbol 330. The transparency of the base layer 30 results in the aperture 320 not being necessary in this example, as the first symbol 330 is accessible and visible without any apertures 320.

Figure 5:
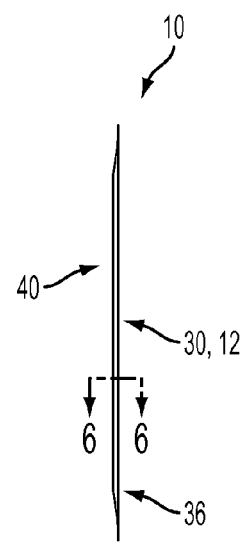
FIG. 5 illustrates a side view of the layered image assembly of FIG. 1 in accordance with an aspect of the present invention.

A side view of the layered image assembly 10 is shown in FIG. 5, where an example orientation between the liner layer 12 and the base layer assembly 30 with the top layer 40 is shown. An inner area 36 is configured to be loaded with media, as described above, and can hold any suitable item that is inserted between the base layer assembly 30 and the top layer 40. In one example, media, such as a set of coupons, can be inserted into the inner area 36 between the base layer assembly 30 and the top layer 40. The inner area 36 can extend along a substantial portion of the area between the base layer assembly 30 and the top layer 40.

Figure 6:
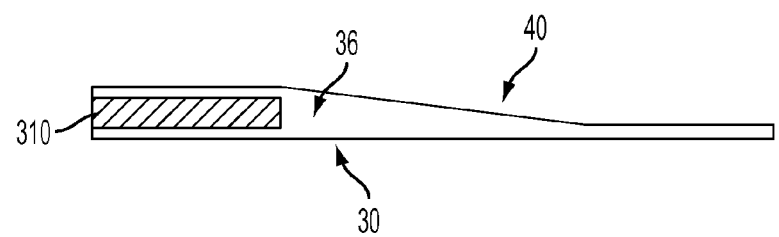
FIG. 6 illustrates a sectional view of FIG. 5 in accordance with an aspect of the present invention.

FIG. 5 shows a side view of the layered image assembly 10 and the inner area 36. FIG. 6 shows a cross-sectional view of the layered image assembly 10 loaded with media in the inner area 36.

Figure 7:
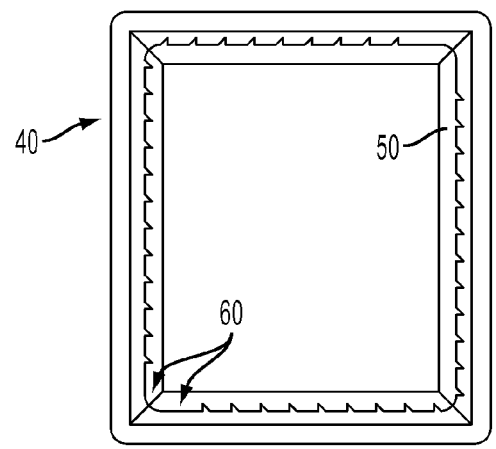
FIG. 7 illustrates a front view for manufacturing the top layer of FIG. 1 in accordance with an aspect of the present invention.

FIG. 7 shows a view of the top layer 40 and the top layer peel-a-way tab 60 which are formed in the lower left corner in this example. It is to be appreciated that the top layer peel-a-way tab 60 can be provided in any suitable area of the top layer 40. The example may also include a glue line, the top layer, the perforation 50, and the media, or z-fold in this example, that is placed inside of the glue line and the pattern of glue that is formed.

FIG. 8 shows a front view of the top layer 40 and a rear view of the liner layer 12 and the base layer assembly 30. In the rear view, an example image 110 is shown floating within the inner area 36. As shown in FIG. 8, the protective liner layer 12 can include a kiss cut 38 that allows the liner layer 12 to be peeled off the base layer assembly 30. The kiss cut 38 is shown as a linear vertical slit; however it can have any other suitable shape and/or orientation as desired. The kiss cut 38 is but one example of a cut or other process that can be used and the liner layer 12 can include other types of other cuts and is not limited to including a kiss cut for the purpose of facilitating a removal of the liner layer 12. The kiss cut 38 is only present along two different portions due to the aperture 320 that is formed, as will be described. The liner layer 12 can include other structure for a user to easily peel off the protective liner layer and to reveal a sticky surface on the base layer 30.

Upon a user receiving the layered image assembly 10, the user can peel off the protective liner layer 12 from the base layer assembly 30 to reveal the adhesive layer. The user can then adhere the entire layered image assembly 10, including the loaded media, to a suitable item. In the example of FIG. 1, the layered image assembly 10 is adhered to an envelope; however, as explained above, is not limited to such. The base layer assembly 30 includes a backing, the backing having a first side that is directly adjacent to the inner area 36. The backing has a second side that is provided with an adhesive layer thereon. An example of the backing is shown with regards to FIG. 14. Because the entire backing of the base layer 30 is adhered to the item such as an envelope, the inner area 36 is effectively closed. The media is protected from both falling out of the inner area 36 and from the environment. Accordingly, the media can only be accessed by removing the top layer 40 of the layered image assembly 10, as discussed herein.

FIG. 9 shows a carrier sheet assembly 210 of twelve layered image assembly assemblies 10. The carrier sheet assembly 210 can be used during manufacturing for a plurality of layered image assembly assemblies 10. The carrier sheet assembly 210 can be used to carry the layered image assembly assemblies and/or to transfer the layered image assembly assemblies to another structure. In one example, the carrier sheet assembly 210 can be comprised of the liner layer 12 or a plurality of liner layers 12. The base layer 30 and the top layer 40 can be assembled on top of the liner layer 12 of the carrier sheet assembly 210. Other configurations and other amounts of layered image assembly assemblies 10 can be placed on a single sheet. FIG. 10 shows a back side of the twelve layered image assembly assemblies 10 on one carrier sheet assembly 210. In this view, the kiss cuts 38 and the apertures 320 can be seen. Thus, when a user removes one of the layered image assembly assemblies 10 from the carrier sheet assembly 210, attaches the individual layered image assembly 10 of FIG. 9 face down onto a base material 20, and a user peels off the front window formed by the inner portion 80 in FIG. 2A, the media or advertisements will be revealed to the user.

Although not shown, the media and/or the base layer assembly 30 can be mounted on a spring assembly such, the media and/or the base layer assembly 30 can wobble in a clockwise and counterclockwise motion with respect to the base material 20 or other surface on which the layered image assembly 10 is mounted. Thus, in one example, media can be loaded into the media inner area 36 of the layered image assembly 10. The media can be mounted onto a spring assembly or the inner area 36 can have a spring assembly between the inner area 36 and the base layer 30. The liner layer 12 can be released to attach the layered image assembly 10 onto a base material 20, such as an envelope. A recipient of the base material 20 can peel the inner portion 80 off the front of the layered image assembly 10 to reveal the media that is mounted on a spring assembly and that can wobble. Both sides of the spring assembly can include one of a permanent, removable, or repositionable adhesive layer thereon. The base layer assembly 30 can be permanently or removably coupled to the base material 20. It is to be further appreciated that any number and type of layers (flat layers, wobble layers, etc.) can be provided underneath the top layer 40. The spring assembly can be substantially similar to the spring assembly disclosed in co-pending U.S. patent application Ser. No. 11/551,945, the entirety of which is incorporated herein by reference. However, it is to be appreciated that any other suitable spring assembly can be employed and is contemplated as falling within the scope of the present invention. Alternatively, or additionally, the base layer assembly 30 can be coupled to one or more of a magnet, suction cup, hook and loop fastener, snap, rivet, button, or any other suitable structure and/or method.

A recipient of a package or envelope can remove the inner portion 80 of the top layer 40 of the layered image assembly 10 to reveal a wobble assembly within the inner area 36 that can be placed on the recipient's refrigerator, for example. Instead of or in addition to a wobble assembly, any other suitable item or items, such as a magnet, coupon, brochure, business card, photo, etc. can be provided under the inner portion 80 within the inner area 36. The top layer 40 can be comprised of a material to protect the layer or layers underneath from damage during shipping.

The layered image assembly invention can also be provided to a consumer in an unfinished form such that the consumer could personalize the top layer. For instance, the consumer could receive a plurality of assembled layered image assembly assemblies in sheet form, such as those shown with respect to FIG. 9. However, unlike FIG. 9, the top layer sheet would be substantially or entirely blank but could include the top layer perforation and instructions for removal of the perforation.

Figure 11:
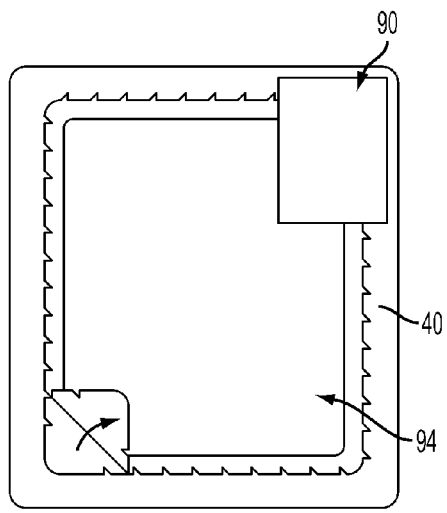
FIG. 11 illustrates a second example of a layered image assembly that includes a postage area in accordance with an aspect of the present invention.

The layered image assembly invention can also include a postage area 90 that invites a user to apply a postage stamp, as shown in FIG. 11. This postage area 90 can be located anywhere along the front view of FIG. 8. In one example, a quadrilateral or other shaped portion can be completely white, and can include text that states, "place stamp here." A postage area 90 will invite a user to apply a postage stamp on to the layered image assembly 10 itself. The scope of the present invention is not to be limited to any particular size or shape for the postage area 90.

Figure 12:
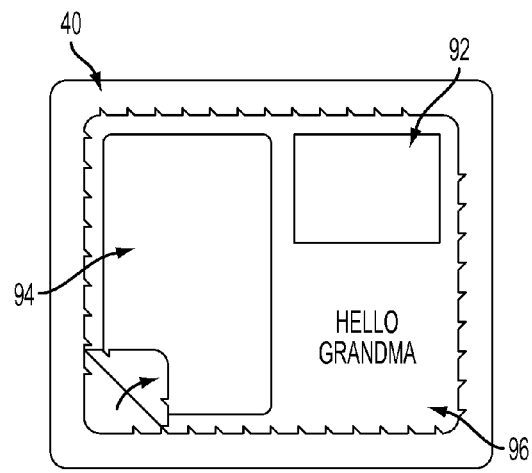
FIG. 12 illustrates a third example of a layered image assembly that includes pre-printed indicia, a transparent window, and a personalized area in accordance with an aspect of the present invention.
Figure 13:
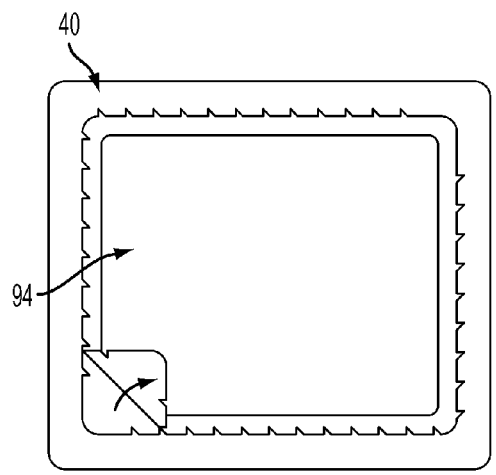
FIG. 13 illustrates a fourth example of a layered image assembly that includes a substantially transparent top layer in accordance with an aspect of the present invention.

Other indicia or pre-printed indicia 92, such as security indicia (not shown), trademark indicia, removal instructions, and/or any other functional and/or decorative images can be provided on the top layer 40 shown in the front view of FIG. 8, the base layer 30, or on the liner layer 12, or on any other layer that is provided. In FIG. 12, an example layered image assembly 10 is shown with a transparent window 94, pre-printed indicia 92, and a personalized area 96. The transparent window 94 can be of a size corresponding to the media located within the inner area 36 of the layered image assembly 10 or the window can be configured to reveal only a portion of the media. The personalized area 96 in this example includes the text "hello grandma." In other examples, other shapes and sizes for the pre-printed indicia 92, the personalized area 96, and the transparent window 94 can be provided. For example, in FIG. 13, an example is shown with a transparent window 94 without pre-printed indicia 92 or the personalized area 96. In any of the examples, any variety of text or images can be provided on any of the portions of the layered image assembly 10. The top layer 40 can include portions that are a solid print, a semi-solid print, or a transparent cover. For example, the pre-printed indicia 92 or the personalized area 96 can be provided on solid colors, semi-solid areas, or on top of a transparent portion. The personalized area 96 can be changed by a company that purchases a plurality of layered image assemblies 10.

Figure 14:
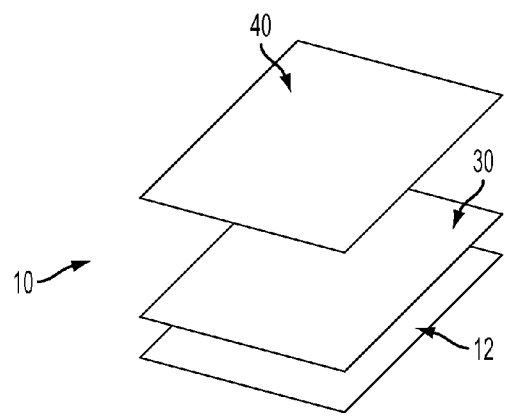
FIG. 14 illustrates an example assembly of the layered image assembly of FIG. 1 in accordance with an aspect of the present invention.

If desired, printing of images or text can be provided on the underside of the liner layer 12, on the top side of the base layer assembly 30, and on the top layer 40. An example of the orientation of the liner layer 12, the base layer assembly 30, and the top layer 40 is shown in FIG. 14. The underside of the liner layer 12 refers to the rear view of FIG. 8 and the underside of the liner layer 12 is also shown in FIG. 14. For example, the underside of the liner layer 12 can include text with instructions on how to remove the liner layer 12. The top side of the base layer assembly 30 refers to the portion of the base layer assembly 30 visible from the front view of FIG. 8 when the peel-a-way tab 60 is removed. The top portion of the base layer assembly 30 is also shown in FIG. 14. For example, the base layer 30 can include text with the name and logo of a company. An image on the top layer 40 can refer to the cover graphic or theme on the front view of FIG. 8 or the view of the top layer 40 shown in FIG. 14. An image as well as text can be included on the top layer 40. For example, text can be included that tells a user to "peel to reveal photos & fun." Text and images can be provided within the inner portion 80 and/or along the frame portion 70. It is also to be appreciated that the top layer 40 can be transparent, semitransparent, or even opaque such that the full image of the photograph or other media within the inner area 36 is either seen, partially seen, or not seen through the top layer 40. The liner layer 12 and the base layer 30, or any other layer, can also be transparent, semitransparent, or even opaque and can have pictures or other text. Any of the layers, such as the top layer, can include various combinations of printing, text, images, and transparent windows 94 or semi-transparent portions.

Although not fully shown herein, any or all of the removable layers can include a tabbed portion for easy removal of the layer. The tabbed portion can be of any suitable size and structure to facilitate such removal. It is also to be appreciated that although the top layer has been referred to herein as a top layer, any other suitable layer(s) can be positioned on top of the top layer. In other words, the top layer does not necessarily mean the topmost layer of the image assembly.

Figure 15:
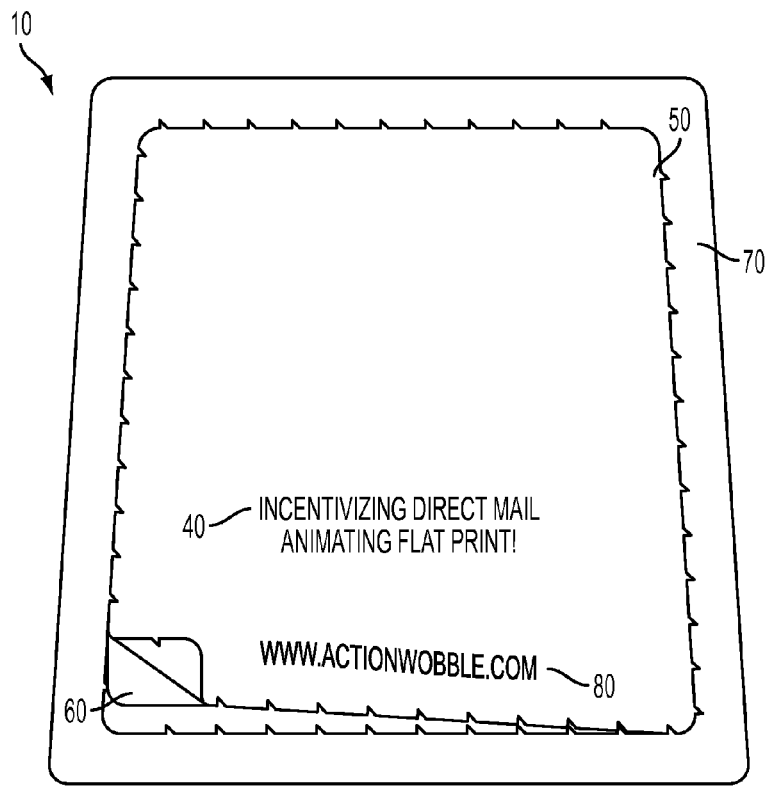
FIG. 15 illustrates a fifth example of a layered image assembly.
Figure 16:
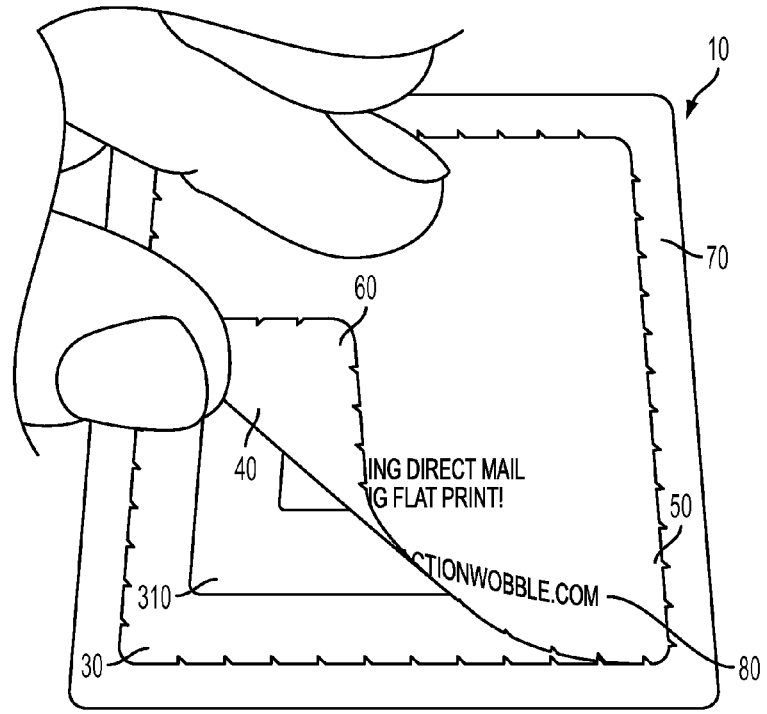
FIG. 16 illustrates FIG. 15 with the top layer partially removed.

FIG. 15 shows one example of the layered image assembly 10 with an example image printed on the top layer 40. The example also includes a perforation 50, a peel-a-way tab 60, a frame portion 70, an inner portion 80, in the same manner as the example shown in FIG. 1. FIG. 16 shows the example of FIG. 15 with the peel-a-way tab 60 of the top layer 40 partially removed by a user. By partially removing the top layer 40, a media 310 is revealed. The media 310 can include a series of coupons, a plurality of images, or a variety of advertisements. The media 310 can include a series of images that are connected together and folded into a book or can include a series of individual images or advertisements that are not connected together. The base layer 30 is also revealed by partially peeling off the peel-a-way tab 60.

Figure 17:
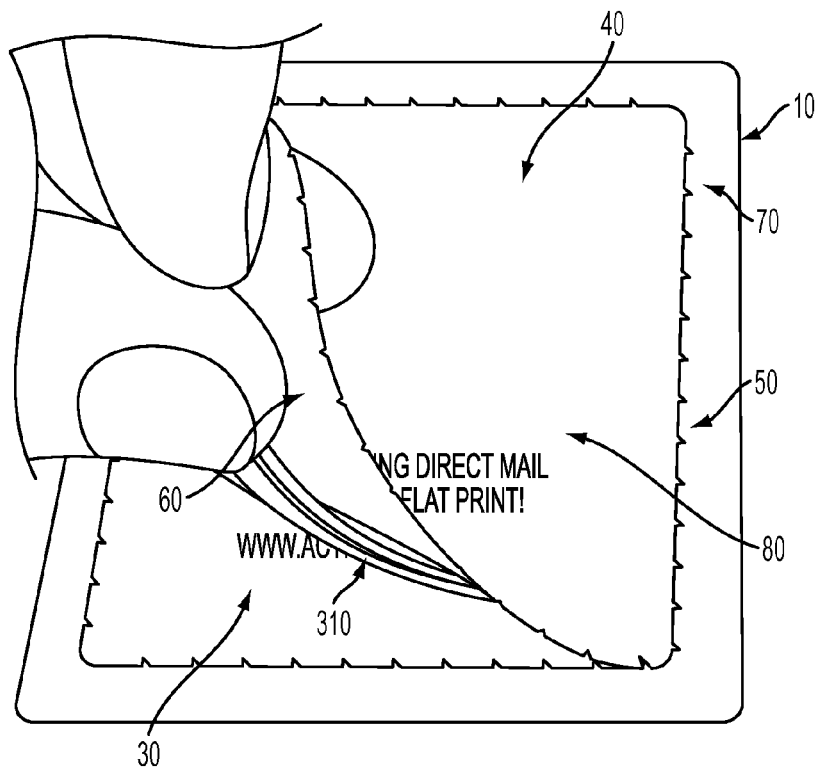
FIG. 17 illustrates FIG. 16 with the top layer partially removed and the media partially removed.
Figure 18:
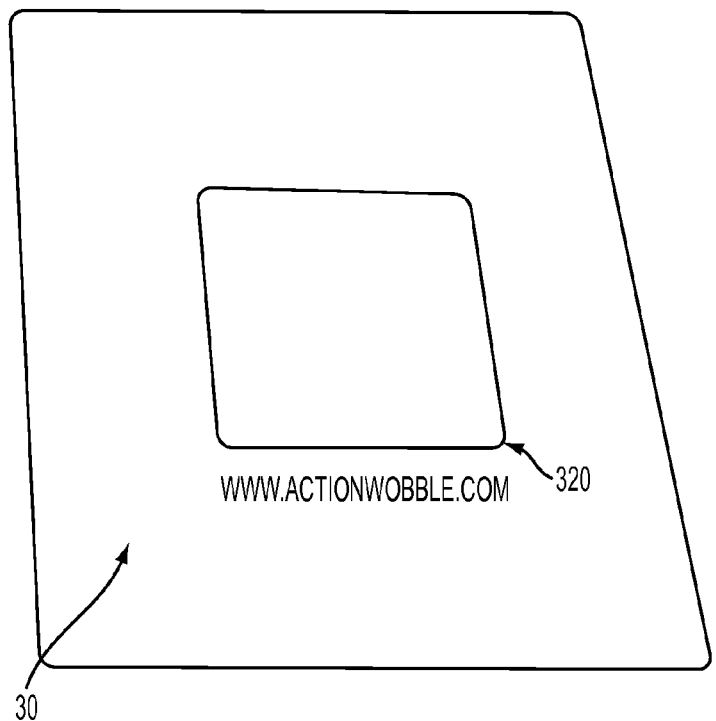
FIG. 18 illustrates a front view of a base layer of FIG. 15.
Figure 19:
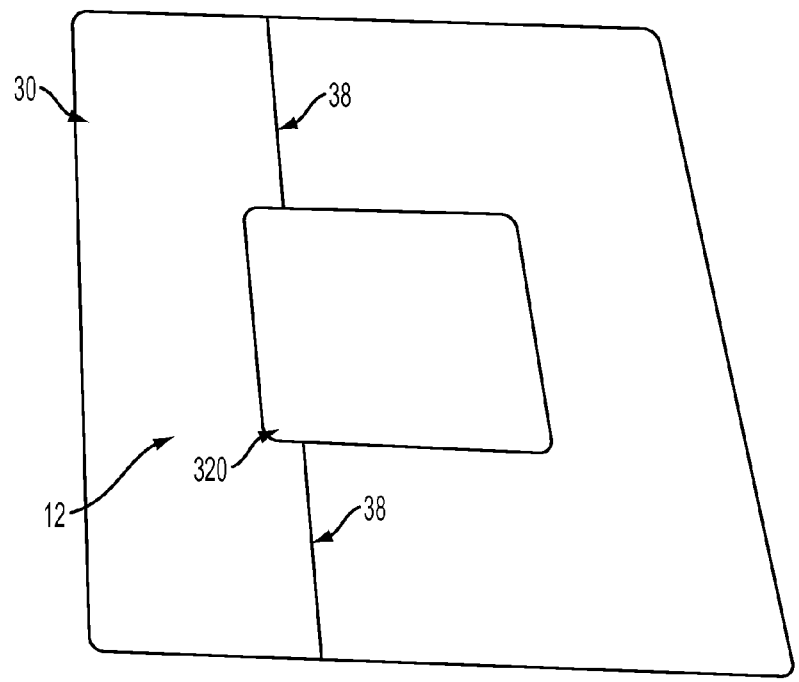
FIG. 19 illustrates a rear view of the base layer of FIG. 15.

FIG. 17 shows the example of FIG. 16 with the media 310 grasped by a user to show a greater portion of the base layer 30. The base layer 30 that is included in this example is shown in FIGS. 18-19. FIG. 18 is a front view of the base layer 30 that further includes an aperture 320, as will be described. FIG. 19 is a rear view of the base layer 30.

Figure 20:
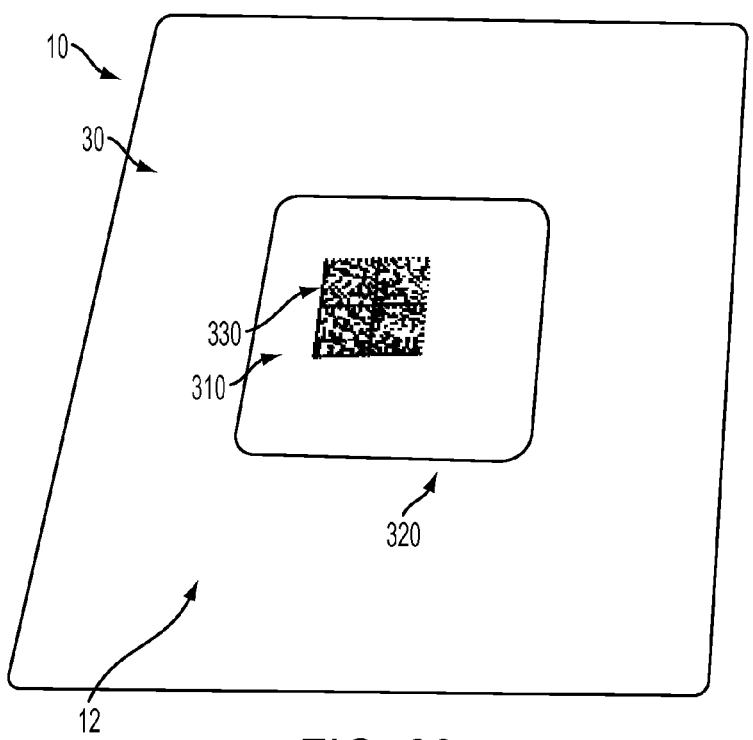
FIG. 20 illustrates a rear view of the fifth example of the layered image assembly shown in FIG. 15.

FIG. 20 shows a rear view of an entire layered image assembly 10 that is already holding the media 310. The media 310 is printed with at least a first symbol 330 on a rear side that is revealed through the aperture 320. The media 310 can further include a second symbol 340 on the rear side that may or may not show through the aperture 320. In the shown example, the second symbol 340 is not visible through the aperture 320. Accordingly, the first symbol 330 is located between the top layer 40 and the base layer 30. The aperture 320 is configured to reveal the first symbol 330 to a device capable of identifying the symbol, such as a camera or other scanner device. FIG. 23 shows an example optical device 400, a scanning camera, that reads the first symbol from the cut-out or aperture in each layered image assembly 10 with a scanning beam 402. The layered image assembly 10 can then be adhered to a suitable item, such as an envelope, a piece of paper, a product, or an object. The layered image assembly 10 is adhered by peeling off the liner layer 12 to reveal the sticky surface. After the layered image assembly 10 is adhered, the first symbol 330 and any other symbols are concealed from view by any recipient. Accordingly, an end-user or recipient of the layered image assembly 10 will not be able to see the first symbol and additional space is provided on the top layer 40 for a variety of other images or other advertisements. The aperture 320 is thus configured to not only reveal the first symbol 330 but also to preserve the entire top layer 40 for images, advertisements, or other information as desired. In other examples, the second symbol 340 could also be revealed through the aperture 320.

Figure 22A:
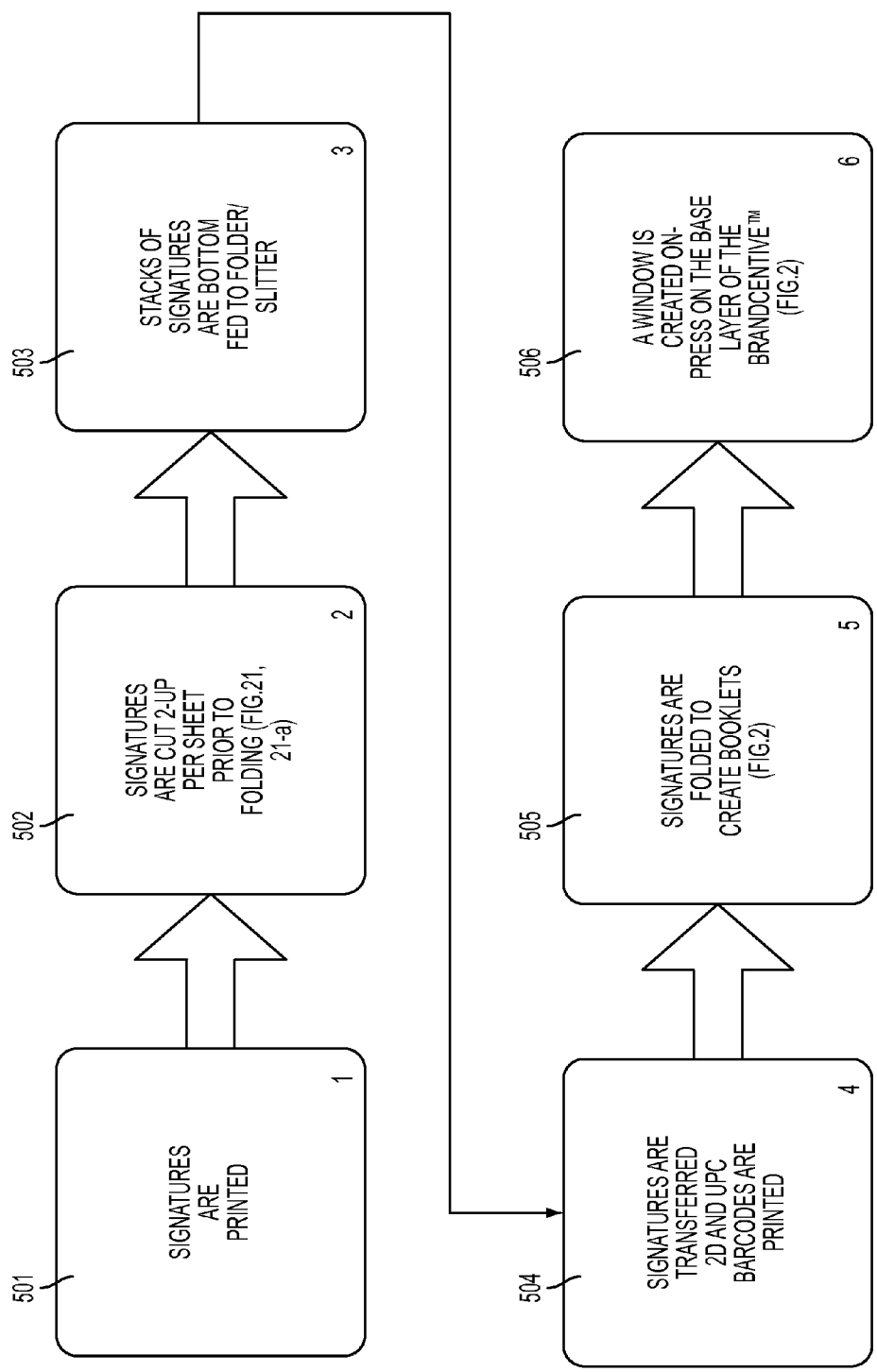
FIGS. 22A-22C illustrates an example flow chart for a methodology of using the layered image assembly.
Figure 22B:
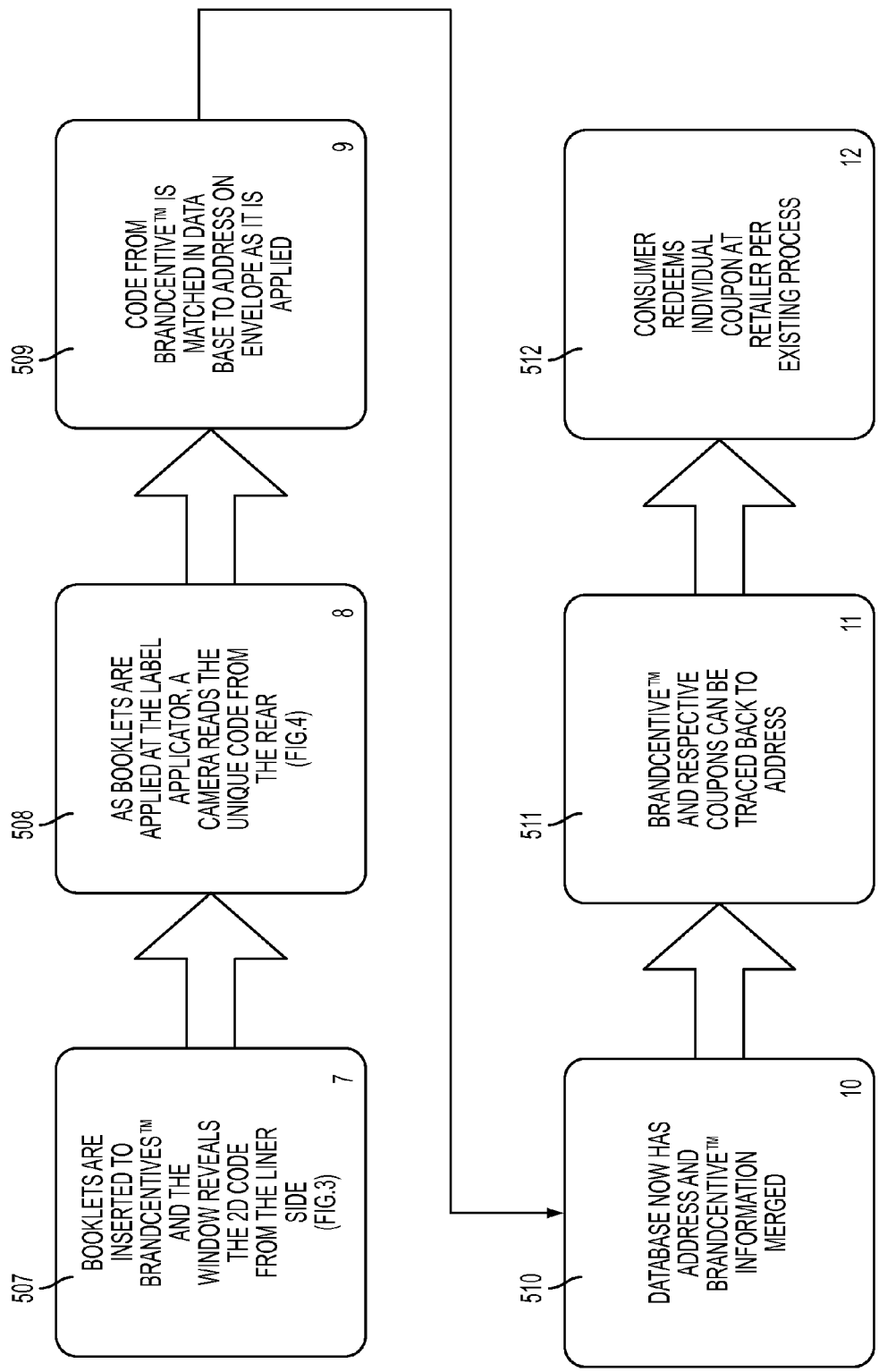
Figure 22C:
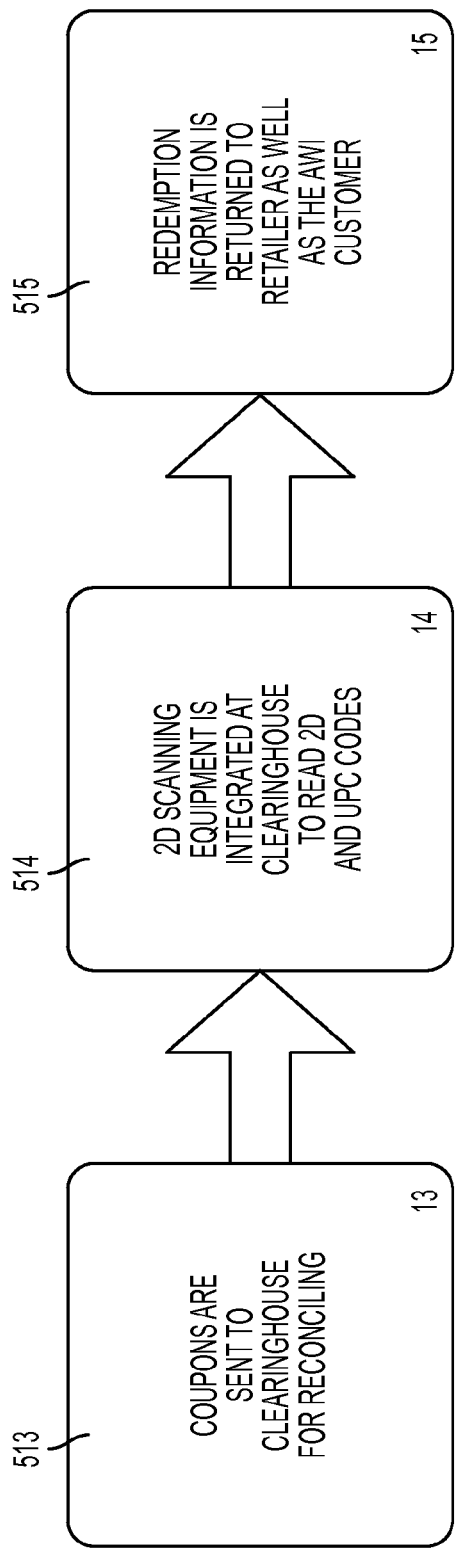

An example method for making and using the layered image assembly 10 is shown in FIGS. 21, 21-a, 21-b, and 22A-22C. The signatures of the example method refer to the individual coupons and media 310 shown in FIG. 21 and the signatures in the booklets shown in FIG. 21-a. FIG. 21-b shows a booklet/media 310 comprising a single panel with a rear side having a first symbol 330 and second symbol 340, or, in the alternative, only a first symbol 330, while the front side includes an offer, advertisement, or the like. FIGS. 22A-22C show the example steps in the method where the signatures, such as the coupons, are first printed. In the first step 501, signatures in the booklets may be printed in a number of ways, including digital printing. With digital printing, both the art work and symbols may be printed in one process. In the alternative, the signatures in the booklet, including either or both the first symbol 330 and second symbol 340 may be produced with an inkjet printer, such that digital printing is not necessary. In the second step 502, signatures are then cut 2-up per sheet prior to a folding step. As shown in the third step 503 of FIG. 22A, the stacks of signatures, or coupons, are then fed to a folder/slitter. As shown in the fourth step 504, the signatures are then transferred and the first symbol 330 and a second symbol 340 can be printed. In this example, the first symbol 330 is a 2D barcode and the second symbol 340 is the UPC barcode, which can refer to a specific product. In other examples, either the first symbol 330 or the second symbol 340 can be a symbol, image data, or any machine readable mark. In still further examples, the first symbol 330 can be replaced by an RFID tag, a printed circuit antenna, a passive antenna array, or invisible ink. Similarly, the second symbol 340 does not have to be a UPC barcode, and instead may include GS1 Databar, or the any similar barcode type system. In addition, some of these alternatives can be provided without needing to form an aperture 320. Some of these alternatives also can still be concealed within the layered image assembly 10. Additional symbols beyond the first symbol 330 and the second symbol 340 can also be provided. It is noted that steps 2-4 502-504 may be accomplished by digital printing and/or the signatures may be printed on a digital sheet.

The signatures may then be folded to create a booklet in the fifth step 505, such as the media 310 shown in FIGS. 16, 17, and FIG. 20. As shown in step 6 506, a window, such as the aperture 320 shown in FIGS. 18-20 is then created on the base layer 30. As shown in step 7 507 of FIG. 22B, the booklets, such as the media 310, are then inserted into the layered image assembly/assemblies 10. The aperture 320 then reveals the first symbol 330 from the underside of the layered image assembly 10. In step 8 508, as booklets are applied at a label applicator, a camera, or other optical device, reads the first symbol 330 from the underside of the layered image assembly. The first symbol 330 can be unique to the booklet, thus identifying the booklet. In further examples, the first symbol 330 can be different for each coupon or advertisement in the media 310, such that the first symbol 330 identifies the specific promotion offered, a targeted marketing group, a manufacturer, etc. The layered image assembly can be used with various promotions, such as Upside mail, statement mail, coupon mail, payroll mail. In further examples, the layered image assembly 10 can be used with subscription magazines or newspapers, such that the layered image assembly 10 is adhered to any of these products. In still further examples, the layered image assembly can be placed on various packaging from FedEx, Dell, Amazon, UPS, Infomercial products, etc such that the customer information 95 can be utilized by the advertiser who has included a coupon in the media 310.

As envelope addresses are applied, the envelope address or other information about the customer that will receive the specific individual booklet is matched in a database to the first symbol 330 in step 9 509. The customer information 95, such as the envelope addresses, can be captured via an optical device or the customer information 95 can be captured by a database of a computer that is printing the envelope addresses. As shown in step 10 510 of FIG. 22B, the database can now merge the customer information 95 with the specific booklet that was provided to that customer. As shown in steps 11 and 12 511, 512, the booklet and each piece of media 310 in the booklet can then be traced back upon redemption to identify the envelope address or any other consumer data that was provided and/or applied to the package from the database. Thus, the first symbol 330 can be applied and then can be used to identify a customer, or an eventual customer, as the first symbol 330 does not correspond to any specific customer until after the database applies the specific envelope address or other customer information 95. Because the first symbol 330, which may be a 2D symbol, is not tied to a mailing address, customer information 95 or data base until the moment the first symbol 330 and layered image assembly 10 is applied to the item 20, there is no need to keep the booklets in order. This eliminates errors and reduces costs as sequential numbering is irrelevant up to this point. Furthermore, the symbols 330, 340 may not include any sensitive or private information, thus eliminating any security or privacy concerns.

In one example, a batch of layered image assembly/assemblies 10 can be produced or mass produced without the database correlating the first symbol 330 to any customer information 95. A company can purchase the batch of layered image assembly/assemblies 10 at a later time, such as a few weeks later, and can then have customer information 95 matched with each of the symbols 330. Alternatively, a company can at a later time provide a data set of customer information 95 that can be matched with the symbols 330 with or without a scanning operation. In this example, the customer information 95 may be matched with the symbols 330 by the database storing the customer information 95 at the time that the symbols 330 and layered image assembly/assemblies 10 are applied to the item 20. In this example, it is only necessary to know the customer information 95 that is applied to the item 20 at the same time as the layered image assembly/assemblies 10 are being applied to the item 20. The method of using the layered image assembly/assemblies 10 and allowing changes to occur later in time thus provides additional flexibility with respect to the medium that is chosen and with respect to customer information 95 that is desired to be changed or that is not known at the time of printing. After the first symbol is scanned, the first symbol 330 is matched or married to at least one piece of customer information 95, such as an envelope address, as well as additional customer information 95.

An example method of manufacturing is shown in FIG. 24. In this example method, a plurality of base layers 30 is unwound from a first spool. A plurality of media 310, which in this example are referred to as booklets, are placed on top of the base layer 30. A plurality of top layers 40 is unwound from a second spool. The top layers 40 are applied after the media 310 is placed on the base layer 30. The top layer 40 is then secured to the base layer 30 with the media 310 such that a user needs to grasp the peel-a-way tab 60 to reveal the media 310 from the front view.

Figure 25:
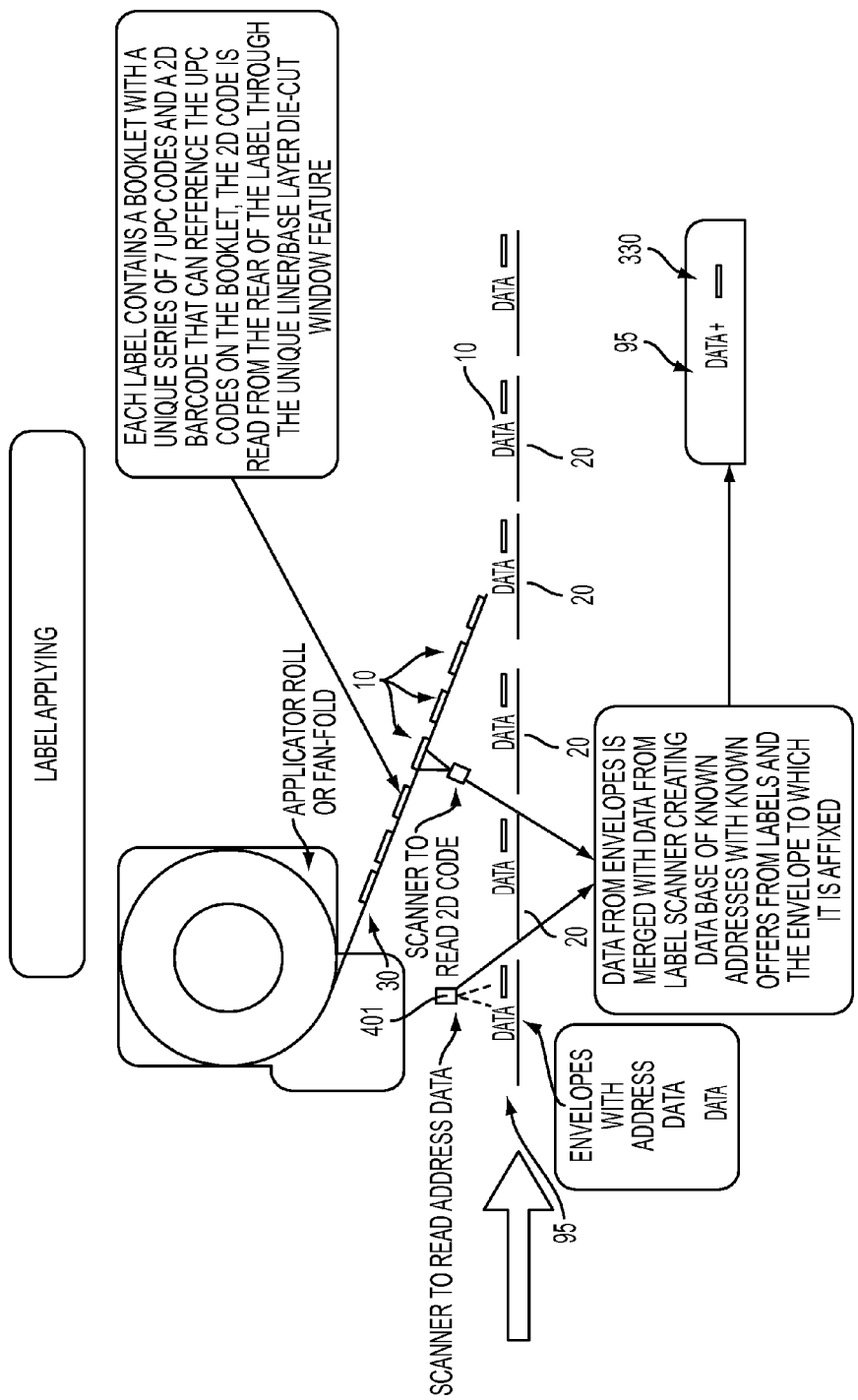
FIG. 25 illustrates an example schematic for applying the layered image assembly as shown in FIG. 24 and further illustrates the detection of a symbol on the layered image assembly and the detection of customer information.

FIG. 25 illustrates an example schematic using the manufacturing process of FIG. 24 and further illustrating the detection of a symbol 330 on the layered image assembly 10 and the detection of customer information 95. The customer information 95 can correspond to an address, an email address, a mail address, or other customer information 95 that is printed on an item 20, such as an envelope, package, mailer, card, magazine, book, food packaging, textiles, including clothing, and any other suitable material or structure. The customer information 95 in this example corresponds to a mailing address. The customer information 95 data is detected by an optical device 401, such as a scanner that has OCR text recognition. Meanwhile, at a different location in the assembly, the optical device 400 reads the first symbol 330, such as a 2D code. Both the customer information 95 and the first symbols 330 that are detected are merged into one database as the information detected is sent to a central location. For example, the merged database matches the known addresses that are detected with the known offers from specific companies found in the media 310. Other example methods can be used for combining the two different data sets, such as combining databases that are used for printing the customer information 95 and the first symbol 330. By reading one symbol on one layer of a multi panel booklet, all of the symbols on all layers in that booklet are known due to the database made during construction.

The first symbol 330 can include information that identifies all of the materials included in the media 310, such as every coupon that is included in the layered image assembly 10. The first symbol 330 also is then matched to the individual consumer information such as their mailing address. Thus, a company that provides an advertisement included in the layered image assembly 10 can scan the second symbol 340, such as the UPC code, which is also included on the booklet, or scan the first symbol 330 after the advertisement is redeemed, as shown in step 12 512 of FIG. 22B. Each advertisement or piece of media can include the same first symbol 330 in one example. By scanning the advertisement, the company can be provided with a variety of data for identifying the customer from the relevant database, such as the customer's name, the customer's mailing address, the customer's email address, the customer's contact information, the customer's biographical information, and a comparison of the dates between when the customer received the advertisement and when it was redeemed. Alternatively, a clearinghouse can compile all the above information to provide a report to the company, as shown in steps 13 and 14 513, 514. Such a report is useful for making informative marketing decisions based on any of the customer information 95. As stated in step 15 515, companies, retailers, or other entities in the supply chain can be provided with the data corresponding to the purchase and the coupon redeemed. The information provided by the first symbol 330 is provided without any additional action by the consumer, who redeemed the advertisement or coupon. The consumer does not have to enter any information or identify to anyone that they have used the coupon.

Figure 26:
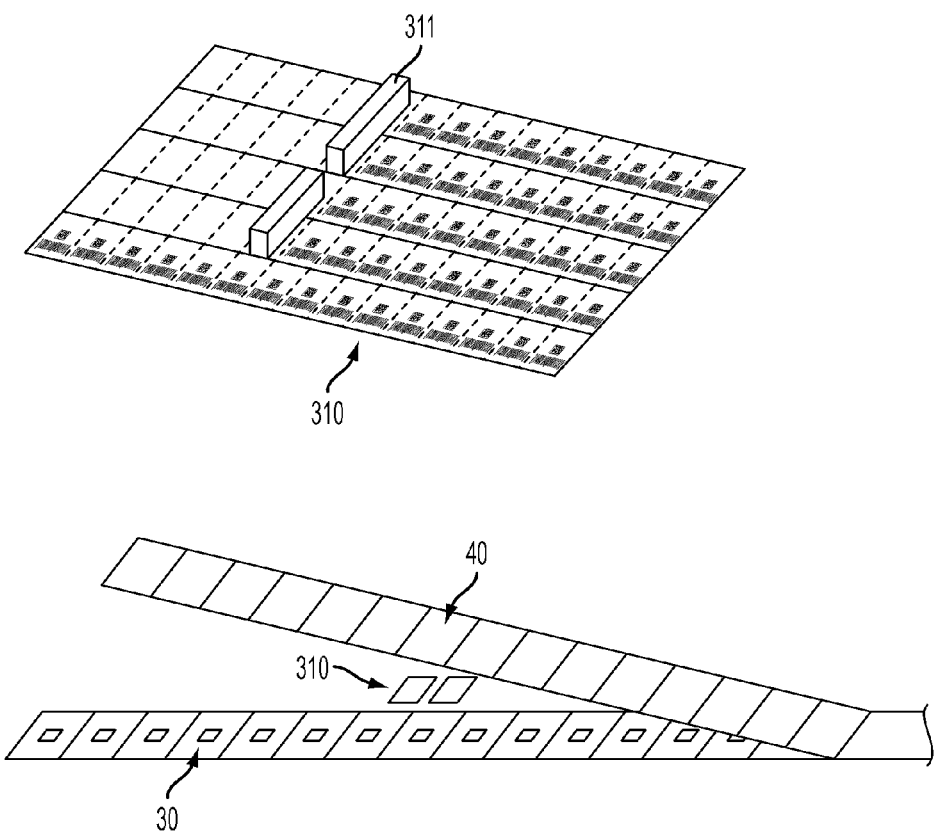
FIG. 26 illustrates an example manufacturing process for the layered image assembly.
Figure 27:
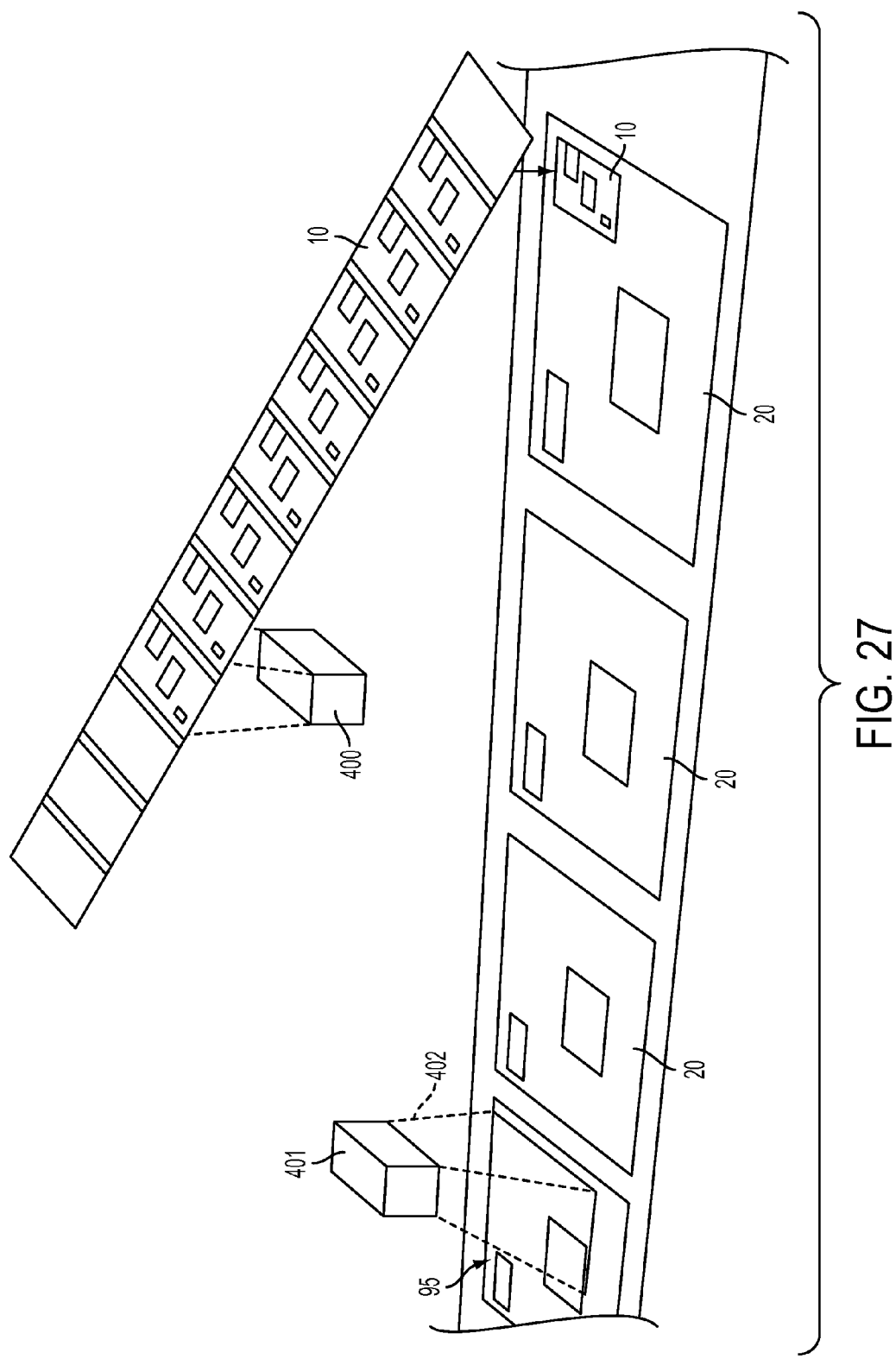
FIG. 27 illustrates further aspects of the process of FIG. 26.
Figure 28:
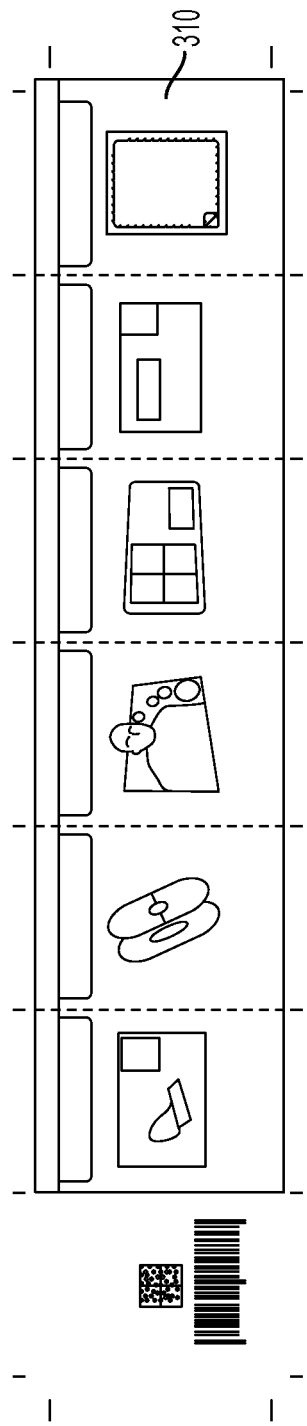
FIG. 28 illustrates one side of a media that is inserted in the layered image assembly and further includes the first and second symbols.
Figure 29:
FIG. 29 illustrates the reverse side of FIG. 28 of the media that is inserted in the layered image assembly and further includes the first and second symbols.

Additional examples of the layered image assembly are also shown in FIGS. 26-29. FIG. 26 illustrates an example manufacturing process for the layered image assembly. This example includes an inkjet spray 311 that is configured to print the first symbols 330 on the media 310. FIG. 27 illustrates further aspects of the process of FIG. 26. This example illustrates how the two optical devices 400, 401 are used to match the first symbol 330 information with the customer information 95 that is detected. FIG. 28 illustrates one side of a media 310 that is inserted in the layered image assembly and further includes the first and second symbols. In this example, the image on the left-most side can correspond to a first symbol 330 that is detected by the optical device during an example manufacturing process. FIG. 29 illustrates the reverse side of FIG. 28 of the media 310 that is inserted in the layered image assembly and further includes the first and second symbols 330, 340. This example illustrates how each individual coupon that is part of the media 310 includes a first symbol 330 and can further include a second symbol 340.

Figure 30:
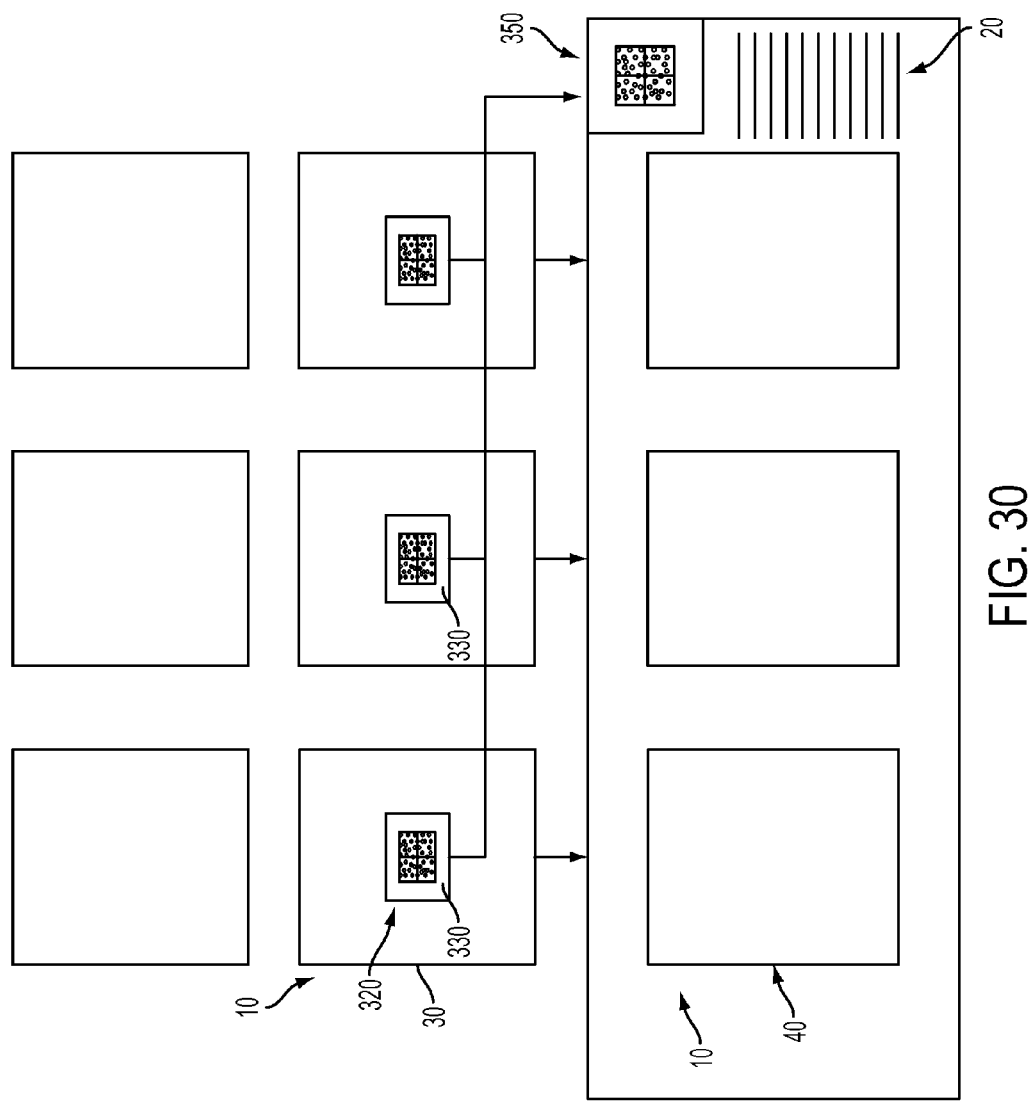
FIG. 30 illustrates an example process for applying a plurality of layered image assemblies on a single item with a master symbol.

FIG. 30 shows an example process for applying a plurality of layered image assemblies on a single item with a master symbol. In this example, a first stage is shown for the print assembly of a plurality of layered image assemblies 10 that are placed on a single item 20, such as an insert or substrate. At least one layered image assembly 10 can be placed on a first side of the single item 20. Alternatively, at least one layered image assembly 10 can be placed on a second side of the single item 20. In still further examples, at least one layered image assembly 10 can be placed on the first side of the single item 20 and at least one layered image assembly 10 can be placed on the second side of the single item 20. For example, three layered image assemblies 10 can be placed on one side and two on the other side. The first stage occurs at a manufacturer of the layered image assemblies 10. In this example, the plurality of layered image assemblies 10 each includes a first symbol 330. The first symbols 330 on the single item 20 can be the same, or can be different from each other to identify the specific layered image assembly 10. At this time, a portion of the first symbol 330 will not contain customer information 95. After the first symbols 330 are detected by an optical device, and successfully placed on the item 20, a master symbol 350 can be printed or sprayed on the item 20. The master symbol 350 can be identical to the first symbol 330, or the master symbol 350 can have a different appearance that identifies to a detection device the item 20. The master symbol 350 can be printed in response to the detection of the first symbols 330 on the item 20. The master symbol 350 may be used to identify all first symbols 330 placed on an item 20 and link them in a database. No customer information 95 is linked or matched to the first symbols 330 or the master symbol 350 at this point. Alternatively, the master symbol 350 can be printed first on an item 20 and in response to the detection of the master symbol 350, appropriate first symbols 330 can be scanned and placed on the layered image assemblies 10 which are on one insert. The master symbol 350 can thus be pre-printed and scanned to create the database link.

FIG. 31 shows the second step of this alternative process which can take place at a different location or at a different time than the steps shown in FIG. 30. For example, the item 20 that contains a plurality of layered image assemblies 10 can be shipped to a company purchasing a batch of layered image assemblies. The company can then use an optical device to detect the master symbol 350. In the next step, the company then uses either the same optical device or a second optical device to detect customer information 95, such as the mailing address of a specific customer. In the alternative, customer information 95 can be printed from a database, such that an optical device is not necessary. Upon both pieces of data being detected, a database then matches the specific item 20 with the master symbol 350 and its layered image assemblies 10 to a specific customer and the customer's information. The layered image assembly 10, or the process shown in FIG. 30 and FIG. 31, allows companies to order batches of layered image assemblies 10 or batches of items 20 that include a plurality of layered image assemblies 10. The companies can then print on-demand or when needed customer information 95, such as mailing addresses. Accordingly, companies can subsequently match the layered image assemblies 10 to specific customer information 95, even as the customer information 95 changes or as the needs of the companies change.

In another example using a master symbol 350, a sheet of coupons can be provided. The coupon that will become the visible coupon after a series of folding operations, such as the coupon on the upper-left location of a sheet of coupons, can include the master symbol 350. Each of the other coupons can include at least the first symbol 330. The first symbols 330 can each include information that identifies the master symbol 350. Thus, the scanning of the master symbol 350 results in identification of each of the coupons in that layered image assembly 10. The scanning of any of the individual first symbols 330 will also result in the identification of some customer information 95 due to the first symbols 330 being matched to the master symbol 350. This example process thus stores a particular master symbol 350 in association with a portion of each first symbol 330. The database can then match the particular master symbol 350 to the contents of each coupon or media that is present in the package, or the series of layered image assemblies 10.

In yet another example using a master symbol 350, a pre-printed sheet of coupons can be printed. The pre-printed sheet can be made from any source. The pre-printed sheet of coupons can then go through a printing process to be provided with at least a first symbol 330. An optical device, such as a camera, can then be used to detect each coupon that is being placed in a single item 20, such as an envelope. In response to this detection, a master symbol is printed onto the item 20 on either side of the item 20. Accordingly, this example process can be used to dynamically add various coupons or other offers to a single package or envelope and a master symbol 350 can be printed that corresponds to the contents of the envelope. This process can be used in combination with any of the other processes already described. It is appreciated that any of the other processes may also be used in concert with each other to provide various layered image assemblies 10 or single items or coupons that include various amounts of first symbols 330, second symbols 340, master symbols 350, etc. that are used to identify specific customers.

What has been described above includes example implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations of the present invention.

It should be evident that this disclosure is by way of example and that various changes may be made by adding, modifying or eliminating details without departing from the scope of the teaching contained in this disclosure. The invention is therefore not limited to particular details of this disclosure.

The invention claimed is:

1. a method of manufacturing a layered image assembly comprising:
   providing a base layer including a first, upwardly facing side and a second, downwardly facing side;
   coupling a printed media to the first side of the base layer, the printed media including at least one first symbol;
   securing a top layer to a peripheral portion of the first side of the base layer, thereby enclosing the printed media between the base layer and the top layer;
   providing an aperture through the base layer such that the printed media is at least partially visible through the aperture;
   applying an adhesive to the second, downwardly facing side of the base layer,
   wherein the at least one first symbol faces at least downwardly and is visible through the aperture in the base layer when viewed from the second side thereof;
   providing a substrate that is separate from the base layer upon which the second side of the base layer is attached,
   wherein after attachment of the base layer to the substrate, the at least one first symbol is no longer visible,
   wherein information is one of printed or provided on the substrate such that the information is readable from the substrate by a reading device;
   wherein the information on the substrate is customer information that includes one or more of a name, address, customer code, and phone number;
   reading the customer information from the substrate;
   storing the customer information acquired from the substrate into a computer database; and
   associating, in the computer database using computer programming, the customer information acquired from the substrate with the at least one first symbol at substantially the same time as when the second side of the base layer is attached to the substrate via the adhesive.

2. The method of claim 1, wherein the base layer is at least partially transparent and the at least one first symbol is visible through the transparent portion of the base layer.

3. The method of claim 1, wherein the top layer is at least partially transparent and wherein at least one second symbol is visible through the transparent portion of the top layer.

4. The method of claim 1, wherein the at least one first symbol is one of a two-dimensional barcode, an RFID tag, a printed circuit antenna, a passive antenna array, invisible ink, a UPC barcode, a number, or a GS1 Databar.

5. The method of claim 1, further comprising:
   associating a first set of media information with the at least one first symbol; and
   storing the first set of media information in a computer database.

6. The method of claim 5, wherein the printed media includes a plurality of offers and the first symbol is a master code that identifies all the offers associated with the printed media, with the plurality of offers being the first set of media information.

7. The method of claim 1, wherein the substrate is at least one of an envelope, postcard, magazine, or package including the customer information printed thereon.

8. The method of claim 1, wherein the media includes at least one coupon or offer.

9. The method of claim 1, wherein the printed media includes a booklet of coupons or offers.

10. The method of claim 1, wherein the top layer includes a perforated portion such that the perforated portion of the top layer can be removed to reveal the printed media.

11. A marketing method utilizing an image reading device for reading a symbol and a computer having computer programming and a database, said method including the steps of:
    reading, using an image reading device, information from at least one first symbol provided on a printed media,
    storing the information in a database using computer programming;
    coupling the printed media to a mailable item, the mailable item having customer information printed thereon,
    wherein the at least one first symbol is read from a downwardly facing surface of the printed media before the printed media is coupled to the mailable item, and when the printed media is coupled to the mailable item, the at least one first symbol is hidden from view and no longer visible;
    acquiring the customer information in a first instance by reading the customer information on the mailable item with the image reading device;
    storing the customer information in the database; and
    associating, in the database using computer programming, the information read from the at least one first symbol with the customer information for later use.

12. The method of claim 11, wherein the at least one first symbol is one of a two-dimensional barcode, an RFID tag, a printed circuit antenna, a passive antenna array, a UPC Code, a GS1 Databar, a number, or invisible ink.

13. The method of claim 12, further comprising:
    receiving the printed media at a clearinghouse from an entity that provided the printed media to the clearinghouse;
    associating, using computer programming, the customer information with the entity that provided the printed media to the clearinghouse; and
    storing the associated information in the database.

14. The method of claim 11, wherein the printed media is incorporated into a layered image assembly that includes a base layer positioned on the mailable item and a top layer.

15. The method of claim 14, wherein the base layer of the layered image assembly includes an aperture therethrough, and the printed media is secured between the base layer and the top layer such that the at least one first symbol is visible through the aperture of the base layer when viewed from a bottom surface of the base layer before the base layer is positioned on the mailable item, and the at least one first symbol is not visible after the layered image assembly is applied to the mailable item.

16. The method of claim 11, wherein the printed media is a booklet, coupon or offer redeemable at a retailer.

17. The method of claim 16, wherein the media is removable from the mailable item by a user and redeemable at a retailer, and upon redemption of the booklet, coupon or offer by a user, the printed media is transmitted to a clearinghouse for reconciliation.

18. The method of claim 17, wherein the clearinghouse reads the at least one first symbol provided on the printed media and transmits information read from the at least one first symbol to at least one of a third party and a manufacturer.

19. The method of claim 17, wherein the clearinghouse compiles information from the printed media relating to the coupon and/or offer redeemed as well as customer information relating to the customer that redeemed the coupon and/or offer associated with the at least one first symbol, wherein the customer information was obtained by reading the printed customer information on the mailable item to which the printed media was applied.

20. The method of claim 11, wherein the at least one first symbol is a master symbol and the printed media comprises a plurality of offers, with the master symbol including information regarding all of the plurality of offers provided on the mailable item, and the master symbol and offer information are stored in the database.

21. The method of claim 20, wherein the database includes information that, using computer programming, matches the master symbol and the contents of each of the plurality of offers with the customer information that was read from the mailable item upon which the printed media was applied.

22. The method of claim 21, wherein the master symbol is associated with address and/or biographical information regarding a customer to which the printed media are provided.

23. The method of claim 22, wherein data stored in the database can be used to make marketing decisions.

24. The method of claim 14, wherein at least one of the base layer and the top layer of the layered image assembly is at least partially transparent or open, with the printed media secured between the base layer and the top layer.

25. The method of claim 24, wherein the layered image assembly comprises a second symbol, with the second symbol being visible through one of the top layer and the base layer.

26. The method of claim 14, wherein top layer of the layered image assembly includes an aperture, with the printed media secured between the base layer and the top layer such that at least one second symbol is visible through the aperture of the top layer.

27. The method of claim 1, further comprising coupling a release liner to the second side of the base layer, said release liner having an aperture therethrough that aligns with the aperture of the base layer.

28. The method of claim 1, wherein the base layer includes a transparent portion that is positioned over the aperture in the base layer such that the at least one first symbol is readable through the transparent portion.

29. The method of claim 11, wherein the customer information includes a customer's name and mailing address.

\* \* \* \* \*

UNITED STATES PATENT AND TRADEMARK OFFICE
CERTIFICATE OF CORRECTION

| | |
|---|---|
| PATENT NO. | : 8,972,277 B2 |
| APPLICATION NO. | : 12/818768 |
| DATED | : March 3, 2015 |
| INVENTOR(S) | : John C. Sullivan et al. |

Page 1 of 1

It is certified that error appears in the above-identified patent and that said Letters Patent is hereby corrected as shown below:

In the Claims

Column 15, line 64, claim 8; Please add -- printed -- before the word "media"

Column 16, line 54, claim 17; Please add -- printed -- before the word "media"

Signed and Sealed this
Thirtieth Day of June, 2015

Michelle K. Lee
*Director of the United States Patent and Trademark Office*